US008494346B2

(12) United States Patent
Abecassis

(10) Patent No.: US 8,494,346 B2
(45) Date of Patent: Jul. 23, 2013

(54) IDENTIFYING A PERFORMER DURING A PLAYING OF A VIDEO

(76) Inventor: Max Abecassis, Boca Raton, FL (US)

( * ) Notice: Subject to any disclaimer, the term of this patent is extended or adjusted under 35 U.S.C. 154(b) by 89 days.

(21) Appl. No.: 13/374,334

(22) Filed: Dec. 22, 2011

(65) Prior Publication Data
US 2013/0163960 A1 Jun. 27, 2013

(51) Int. Cl.
H04N 5/92 (2006.01)
H04N 5/93 (2006.01)

(52) U.S. Cl.
USPC .......................................... 386/244; 386/248

(58) Field of Classification Search
USPC ................ 386/248, 244, 239, 245, 240, 241, 386/343, 353
See application file for complete search history.

(56) References Cited

U.S. PATENT DOCUMENTS

| 5,434,678 | A | 7/1995 | Abecassis | |
|---|---|---|---|---|
| 6,101,274 | A * | 8/2000 | Pizano et al. | 382/176 |
| 6,192,340 | B1 | 2/2001 | Abecassis | |
| 6,208,805 | B1 | 3/2001 | Abecassis | |
| 6,408,128 | B1 | 6/2002 | Abecassis | |
| 6,504,990 | B1 | 1/2003 | Abecassis | |
| 6,553,178 | B2 | 4/2003 | Abecassis | |
| 2009/0234890 | A1 * | 9/2009 | Lee et al. | 707/104.1 |
| 2013/0060875 | A1 * | 3/2013 | Burnett et al. | 709/206 |

* cited by examiner

Primary Examiner — Robert Chevalier

(57) ABSTRACT

An apparatus capable of, and a method comprising the steps of: receiving, from a user, during a playing of a video, a request for information identifying a performer of a character that is depicted during the playing of the video; pausing the playing of the video in response to the request for information; providing, the user, the name and a visual depiction of the depicted character, and the name and a visual depiction of the performer of the depicted character; and providing, the user, the option to obtain a filmography corresponding to the performer of the depicted character.

20 Claims, 10 Drawing Sheets

IDENTIFYING A PERFORMER DURING A PLAYING OF A VIDEO

BACKGROUND OF THE INVENTION

1. Field of the Invention

Systems for, and methods of, providing, a user, during a playing of a video, an identification of the performer of the character that is depicted in a video. The source of the identifying information is provided by a map of the video that identifies the performer/characters that are visually depicted within the video. The map of the video may be provided by the source that provides the video or by a source other than the source that provides the video. A source of the video may be a hard format such as a DVD or Blu-ray disc, or a soft format that is broadcasted, narrowcasted, delivered on-demand, streamed, and/or downloaded by a variety of means such as over-the-air broadcast, cable, satellite, cellular, internet, and any other means of receiving content/data. The means for playing the video comprises any device capable of playing video such as, for example, an optical disc player, a personal computer, a set box, a multimedia player, gaming device, and/or smart phone.

2. Description of the Related Art

DVDs and Blu-rays are "optical discs" capable of storing one full length motion picture in one of two layers on either side of the disc. Optical discs generally provide scene selection and subtitles and/or closed captioning in a plurality of languages. Among other features, some optical discs include multiple camera angles for a scene, and the capability to play one of a plurality of different content versions (e.g. a director's cut or unrated version and an "R" rated versions). Blu-rays provide more advanced features such as a search function that list keywords corresponding to noteworthy names, items, and actions, and enable a user to select a keyword to retrieve segments matching the keyword selection.

Devices capable of playing optical discs provide for, among other features, fast-forward, fast-rewind, skip-forward or skip-backwards by chapters, turn on/off subtitles, subtitle and audio language selection, camera angle selection, and optical disc menu navigation to select, for example, multiple content versions.

While the optical discs formats provide many capabilities and functions exceeding those provided by, for example, conventional linear playback formats, many of the capabilities and functions do not fully realize the potential of a random access video playback capability that is synergistically integrated with a map of the content of the video. Optical disc playback devices do not provide a readily accessible identification of a performer/character depicted in a segment within a video. These deficiencies are not addressed by the many sources that provide a listing of the performer/characters present in a video, including, for example, the beginning and ending credits in a video, information in optical disc packaging, video listings, and a great variety of web sites, or the various sources that may identify performer/characters present in the clips of a video.

BRIEF SUMMARY OF THE INVENTIONS

The present inventions relate generally to system and methods for providing a user, during playback of a segment from within a video, an identification of the performer/character that is depicted in that segment. By contrast to the usual passive viewing of a video, or the interactive playing of a video, as in the playing of a computer game, a primary element of the "autoactive" systems and methodologies disclosed herein is the synergistic integration of a map of the content of the video with the playing of the video to satisfy the real-time informational interests of a user and to deliver a more informed video viewing experience.

Accordingly, it is an object of the present inventions to provide, during a playing of a video, with efficient access to information that identifies the performer/character that is depicted in a segment within a video.

It is also an object to provide for an appropriately labeled key on a remote control device for efficient access to the performer/character identification function.

It is also an object to link the identification of the performer/character with other content available, within the video, for the selected performer/character.

It is also an object to link the identification of the performer/character with other content available, from a source external to the video, for the selected performer/character.

Briefly, these and other objects are accomplished by autoactive capabilities and functions provided by systems comprising, and methodologies utilizing processing, random accessing, and control software functions, integrated with video segment information, such as information that identifies performers and characters that are depicted within the video.

In one of a number of embodiments, a video is first analyzed to define segments within the video responsive to the depiction of a significant or noteworthy character and/or performer. Segments are associated with a descriptor relating to the depiction of a character and the performer of that character. Each of the characters is associated with an image of the character from the video, preferably a 2T-shot featuring the character, and each of the performers is associated with an image of the performer such as a publicity head shot. During playback of the video, when a user desires to identify the name of the performer and/or character depicted in any particular segment of the video, the user activates a dedicated "Who" feature that enables the display of information identifying the performers and characters at that particular segment. The software routines supporting the Who feature identify the current location in the video, query a segment database to find the segment that includes the current location within its beginning and ending frames, retrieve performer/character identifying information such as the performer's and the character's name together with a picture to enable visual identification by the user.

This and other embodiments, features, advantages, and objects, are apparent in the context of the detailed description, accompanying drawings, and appended claims that follow.

BRIEF DESCRIPTION OF THE DRAWINGS

The following drawing figures, which form a part of this application, are illustrative of embodiments of the present invention and are not meant to limit the scope of the invention in any manner.

DETAILED DESCRIPTION OF THE INVENTIONS

Figure 1A:
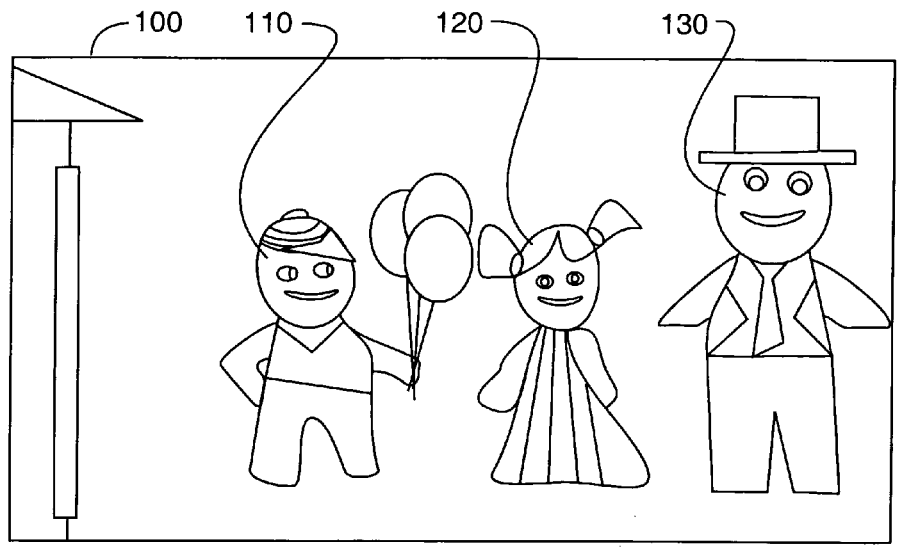
FIG. 1A is a representation of a video frame within a motion picture.

U.S. Pat. Nos. 5,434,678; 6,192,340; 6,208,805; 6,408,128; 6,504,990; 6,553,178; and their respective divisions are incorporated herein by reference. Where a particular detail disclosed in an incorporated reference and a detail described here may appear inconsistent, the detail disclosed in the incorporated reference should be understood as an alternative detail description.

For purposes of the present disclosure, various terms used in the art are defined as follows:

The term "associate" refers to assign, give, allocate, associate, designate, ascribe, attribute, link, and/or relate.

The term "character" refers to a role or a part in a video, and/or a participant in a video, typically displaying human-like qualities.

The term "chapter" refers to a division of a video generally defined by the author of the video. Optical discs, for example, typically have multiple chapters such as with DVDs, which often refer to a chapter as a scene.

The term "clip" refers to a segment that is smaller than a chapter and usually smaller than a scene. A clip includes one or more contiguous shots, and usually depicts the same primary characters within a location. A clip's definition is responsive to a material change in the participation of the principal characters, a material change in location, and/or a distinct change in thematic content or topic of conversation.

The term "content preferences" refers, specifically and principally, although not exclusively, to a user's preferences for the form of expression, explicitness, the absence of objectionable segments, content categories and levels, length, detail, subjects, versions, thematic content, and items. A set of content preferences also includes technical preferences and presentation preferences. In the broadest sense, the term content preferences further comprises video, programming, and subject matter preferences (collectively "programming preferences"). Programming preferences refer exclusively to a user's preferences as to specific videos (e.g. Sega's "Sherlock Holmes Consulting Detective"), types of videos (e.g. interactive video detective games), broad subject matter of videos (e.g. mysteries), and/or time and date that the user may desire to view a video. Programming preferences are principally directed at the selection of a specific video.

The term "content-on-demand system" refers to a video-on-demand system that is responsive to a user's content preferences. A content-on-demand system not only permits a user to obtain a specific video(s) or segment(s) of videos in response to the user's programming preferences, a content-on-demand system also permits the user to receive a version of the video(s) or segment(s) of videos that are responsive to the user's other types of content preferences. A content-on-demand system and the delivery of variable content video services as described herein may utilize a variety of types of hardware and network infrastructure and are not limited to any particular hardware or network infrastructure that may be employed in a given implementation.

The term "dialog" refers to a dialog, conversation, monologue, lyric, utterance, and/or communication. Dialog also comprises information that may be included in the subtitles or the closed captioning.

The term "item" refers to: (i) an object, article, artifact, instrument, device, or product; (ii) a specific act or action within an activity, process, event, or operation; (iii) an emotion, expression, gesture, or movement; (iv) an effect, consequence, or result; (v) a sound, occasional foreign language, or melodic content; (vi) a portion of a dialog, line, or linguistic expression; (vii) a special effect, cinematographic effect, technical transition, or production error; and/or (viii) a cameo or special appearance.

The term "keywords" refers to words, terms, phrases, designations, codes, descriptors, labels, data, metadata, numbers, or other information that identifies, describes, and/or categorizes content of a video or portions of a video. Keywords comprise, for example, words that identify, describe, and/or categorize the content of an item segment or of a thematic segment within a video.

The term "keywording" refers to associating keywords.

The term "network" herein refers to any private or public, wired or wireless video transmission infrastructure, such as may be provided by the utilization of one or a hybrid combination of the following: fiber optic, coaxial cable, twisted copper wire, cellular, radio, satellite, and/or other existing and/or forthcoming video transmission technologies. Examples include a Broadband Integrated Services Digital Network ("B-ISDN") utilizing fiber optic cable in its primary trunks, a Digital Subscriber Line that provides high bandwidth over twisted copper-pair phone lines, and the interne. In the broadest sense, a network also comprises the utilization of, for example, the U.S. Postal Service to deliver DVDs.

The term "noteworthy" in connection with content refers to content that: (i) may be of interest to a significant audience; (ii) is noteworthy, remarkable, or compelling; and/or (iii) is uncommon, atypical, peculiar, unusual, unique, rare, or extraordinary.

The term "performer" refers to an individual, participant, actor, or actress, appearing in a video and/or credited for the physical and/or the verbal performance of a character. A performer refers to, for example, an actor in a motion picture, an athlete in a televised sporting event, a newscaster in a news program, and a chef in a cooking show.

The term "playing", as in playing a segment of a video, refers to playing meaningfully, or substantially all or a portion of a segment. In other words, while a method or system may suggest or intend to play the entirety of, or all, of a segment, it is not necessarily required that in doing so every aspect of the video segment, audio, sub picture segment portion, interleaved unit, frame, and/or bit of data of the segment will be played or need be played.

The term "search terms" refers to terms, words, phrases, designations, codes, descriptors, labels, data, metadata, numbers, or other information that identifies, describes, or specifies what is being searched.

The terms "segment" and "video segment" refer to one or more video frames.

The term "shot" refers to a sequence of video frames resulting from a single continuous run of a video camera.

The terms "thematic" or "theme", refer to a theme, subject, topic, composition, concept, motif, idea, sequence, and/or activity. Thematically related video content may comprise: i) a particular activity, process, event or operation; or ii) a particular topic in a conversation, discussion, or dialog.

The term "thematic segment" refers to a sequence of video frames comprising thematically related video content. A thematic segment is generally smaller than a chapter, generally comprises one or more contiguous shots of video occurring during a contiguous period of time, and is generally longer than an item segment and a dialog segment.

The term "user" as used herein is meant to include and be interchangeable with the words "player" (when referring to a person), "subscriber", and "viewer". That is, the term "user" is to be understood in the general sense of, for example, a person actively using video content, passively viewing a video, interactively playing a video game, retrieving video from a video provider, and/or actively using multimedia, interne, and/or communication services.

The term "variable content video" refers to a video characterized by a nonlinear architecture facilitating a variety of possible logical sequences of segments. A variable content video comprises segment information and parallel, transitional, and/or overlapping segments. The parallel, transitional, and/or overlapping segments may support, for example, objectionable content control and focused versions. A variable content video may also include a user interface, software program routines, and system control codes for controlling the playing of the video/audio.

The terms "video" and "video program" are interchangeable and refer to any video image regardless of the source, motion, or technology implemented. Unless otherwise qualified to mean a computer software program, the term "program" is interchangeable and may be replaced with the word video. A video comprises images found in full motion picture programs and films, in interactive electronic games, and in video produced by multi-media systems. Video comprises still characters, graphics, images, motion pictures, films, and multimedia productions; full motion pictures and television programming; news, sports, cultural, entertainment, commercial, advertisements, instructional, and educational programming. As the context permits, a video may also comprise video, audio, sub picture information, a video map (e.g., navigation data), or other information associated with the video, such as a user interface, software program routines, and system control codes.

The terms "video map", "map", and "segment map", refer to a combination, arrangement, table, database, or listing of information comprising an identification of a beginning and ending of one or more segments and at least one descriptor associated with at least one segment or a sequence of segments. A descriptor is a word, term, code, phrase, or designation to describe or categorize. A video map comprises, for example, a combination, arrangement, table, listing, tables and fields, database, metadata, or xml file, or other data comprising segment information.

The term "video-on-demand system" refers to any video delivery system that is responsive to a user's programming preferences, i.e. provides a user-selected video at a user-selected time. Video-on-demand comprises for example movies-on-demand, video dial tone, cellular video, and digital satellite systems that are responsive to a user's time and date preferences and that provide play control functionality in the viewing of a video.

Where not clearly and unambiguously inconsistent with the specific context, these and other terms defined herein are to be understood in the broadest sense.

The teachings herein with respect to a video may be applied to, for example, any type or kind of content that may be captured in a video format, including motion pictures, movies, television programs, news programs, sports programs, educational videos, advertisements, informationals, commercials, and other videos that promote products and services. While a particular feature may be detailed with respect to a specified type of video, it is intended to apply the teachings herein broadly and harmoniously across all different types and classes of video, including, for example, and not by way of limitation, a variable content video and a variable content game.

FIG. 1A is a representation of a video frame within a motion picture. The frame 100 of the video depicts three characters: a boy carrying balloons 110, a girl 120, and a man 130.

Figure 1B:
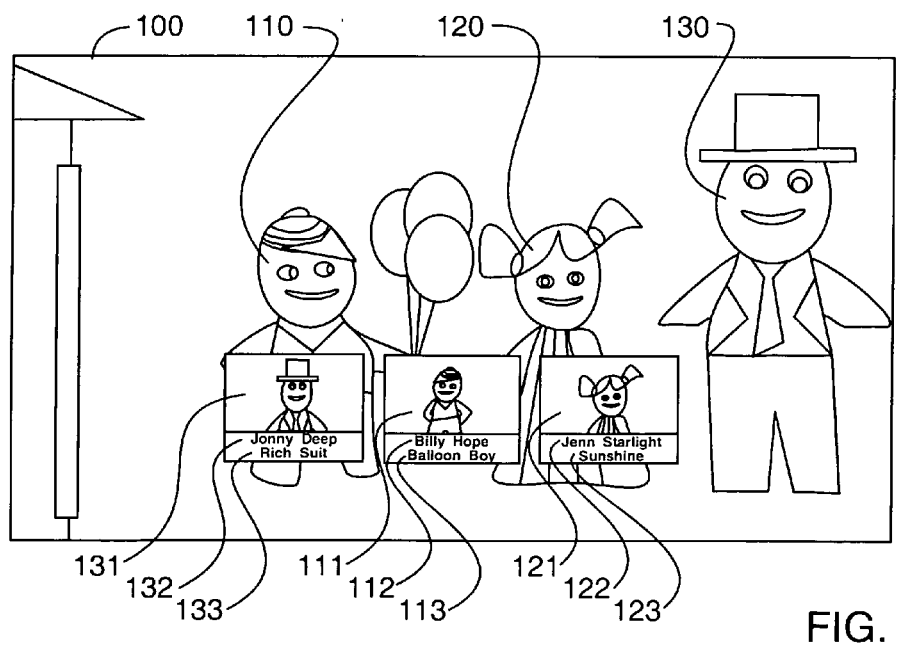
FIG. 1B is a representation of a video frame within a motion picture and the display of a visual depiction of characters and corresponding performer's and character's name.

FIG. 1B is a representation of a video frame within a motion picture with a "Who" feature activated. In this instance the frame 100 of the video is the same as shown in FIG. 1A and depicts the three characters: a boy carrying balloons 110, a girl 120, and a man 130. In one embodiment, superimposed on that frame of video are a visual depiction of each of the characters and corresponding performer's and character's name. In the case of the boy carrying balloons 110, an image of the character extracted from within the video is displayed 111, together with the performer's name "Billy Hope" 112 and the character's name "Balloon Boy" 113. In the case of the girl 120, an image of the character extracted from within the video is displayed 121, together with the performer's name "Jenn Starlight" 122 and the character's name "Sunshine" 123. In the case of the man 130, an image of the character extracted from within the video is displayed 131, together with the performer's name "Jonny Deep" 132 and the character's name "Rich Suit" 133. An image of a character depicted in a video need not be extracted from the video itself, a suitable image of the character may be provided by a great variety of means including, for example, downloading a character image from a suitable website by means of a link provided with identifying information.

The embodiment illustrated in FIG. 1B offers several advantages. For example, the inclusion of an identifying picture 111, 121, 131 enables easy visual identification by the user. FIG. 1B shows that the visual depiction that is extracted from within the video is a suitable video frame, preferable depicting a close-up, 2T-shot or medium shot of only one character. A visual depiction need not be limited to a single image or frame of video, a visual depiction comprises video. The inclusion of an identifying picture or video content from within the video is in certain situations more advantageous in facilitating identification than including an image of the performer, such as may be obtained from a current publicity headshot or close-up photograph. Often a performer in role is not recognizable or easily recognizable from a current photograph. Providing the character name is also advantageous in enabling the user to learn the character's name.

Figure 1C:
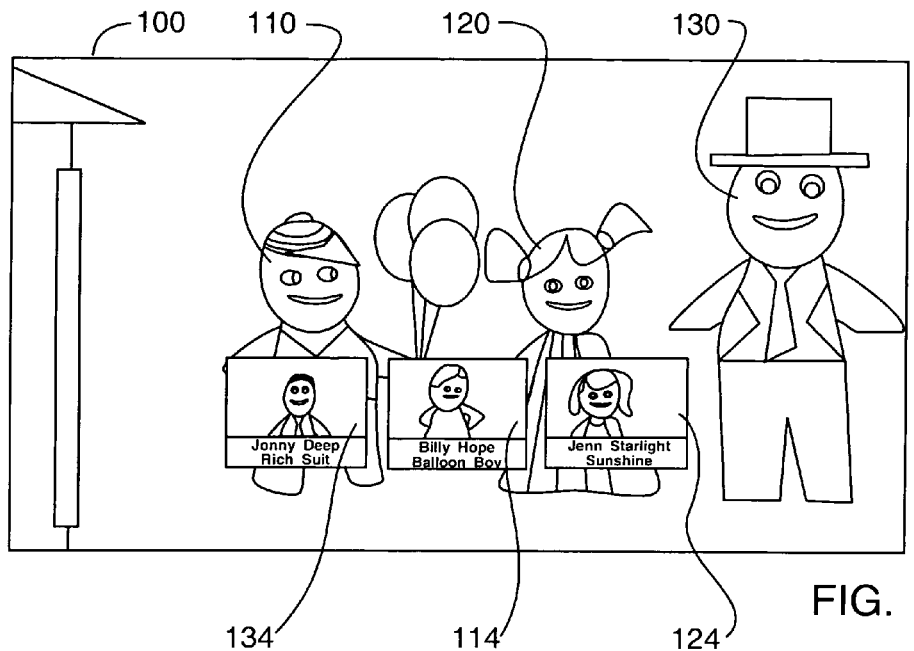
FIG. 1C is a representation of a video frame within a motion picture and the display of a visual depiction of performers and corresponding performer's and character's name.

Nonetheless, in a preferred embodiment, and optionally in response to a pre-established user preference, the visual depiction is a current image of the performer. In the alternate embodiment, instead of being extracted from within the video, the visual depiction is an image of a current publicity close-up photograph of the performer. FIG. 1C is a representation of a video frame within a motion picture and the display of a visual depiction of performers and corresponding performer's and character's name. In the case of the boy carrying balloons 110, the image of the character extracted from within the video is not displayed, and instead an image of a current publicity close-up photograph of the performer 114 is used (the boy has gotten older). Similarly, in the case of the girl 120 and the man 130 images of current publicity close-up photograph of the performers 124 134 are used. Such an image and other suitable images may be provided by a great variety of means including, for example, downloading an image from a suitable website by means of a link provided with identifying information.

Figure 1D:
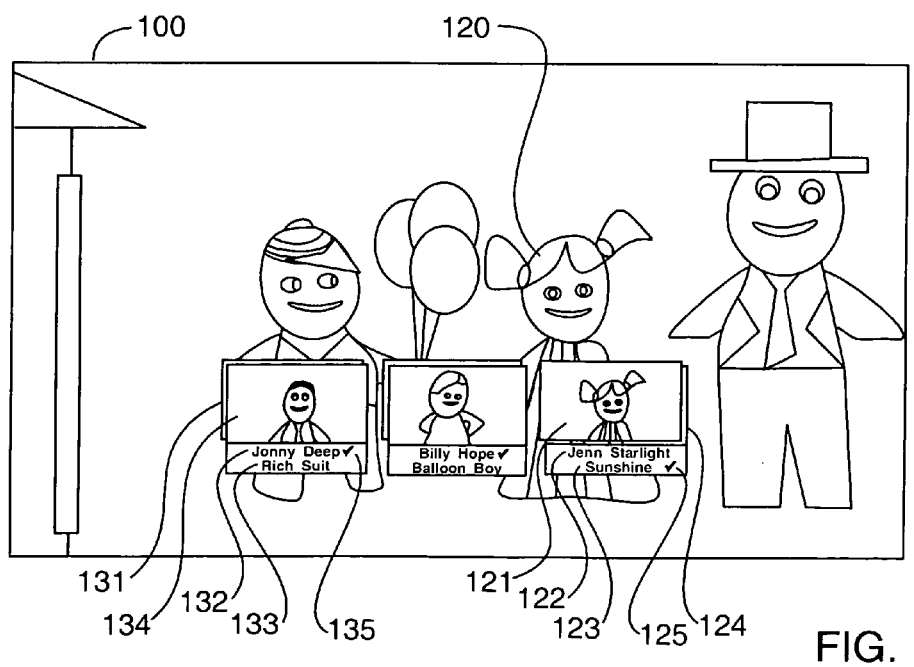
FIG. 1D is a representation of a video frame within a motion picture and the display of a visual depiction of both performers and characters.

The particular embodiments shown in FIG. 1B and FIG. 1C may be offered to the user as a user configurable option and/or synergistically combined. FIG. 1D shows one of many possible manners in which a viewer may be provided access to both a visual depiction of the character that is extracted from within the video and an image of a current close-up photograph for the performer of the character. In the example of FIG. 1D, in the case of the man 130, the image of the character extracted from within the video 131 is shown underneath the overlapping image of a current close-up photograph 134. The "check" mark 135 next to the performer name indicates that the image is of the performer and not of the character. In the case of the girl 120, for example, clicking the character name 122 or image 124, the image of the character extracted from within the video 121 is brought forward and shown on top of the image of a current publicity close-up photograph 124. The "check" mark 125 next to the character name indicates that the image is of the character and not of the performer.

Figure 1E:
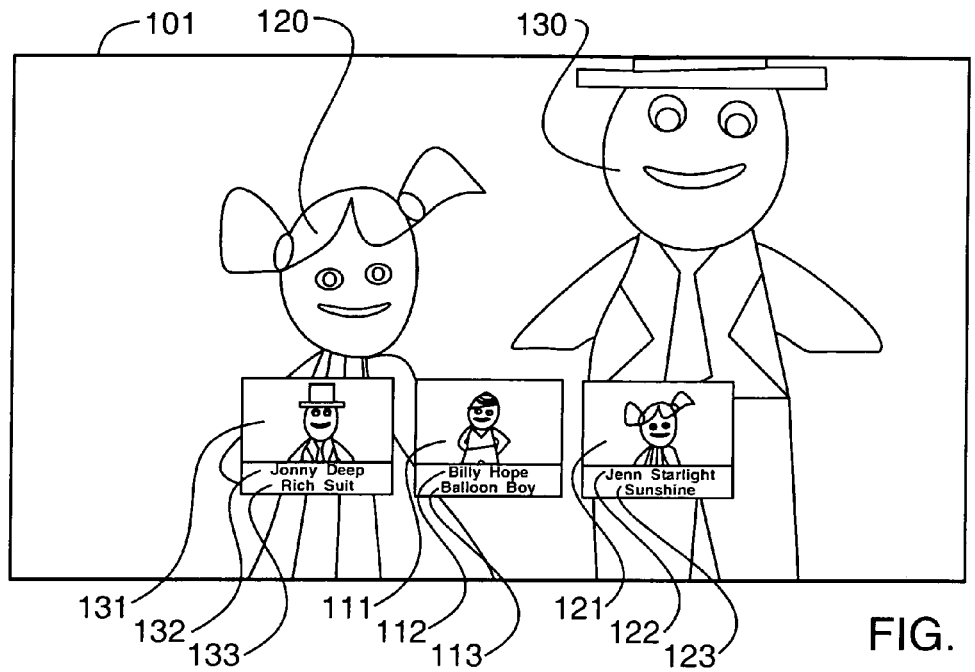
FIG. 1E is a representation of a video frame within the motion picture at a subsequent instance within the same clip as in FIG. 1A.

In the illustration of FIGS. 1A and 1B, the frame of the motion picture is unchanged. In other words, the example presumes that the user has activated the Who feature at that instant that the target character is on the screen. This need not be and is often not the case. FIG. 1E is a representation of a video frame 101 within the motion picture at a subsequent instance within the same clip that includes the video frame 100 shown in FIG. 1A. In this case, the camera has focused on the girl 120 and the man 130, and the boy 110 depicted in the video frame 100 of FIG. 1A is not present in the shot (frame 101 of FIG. 1E. Since the segment definition is controlled by the clip specification, and in this instance video frame 101 is within the same segment definition as video frame 100, the identification of the performers and characters (111, 112, 113) (121, 122, 123) (131, 132, 133) as is, for example, shown in FIG. 1B remains the same.

Figure 1F:
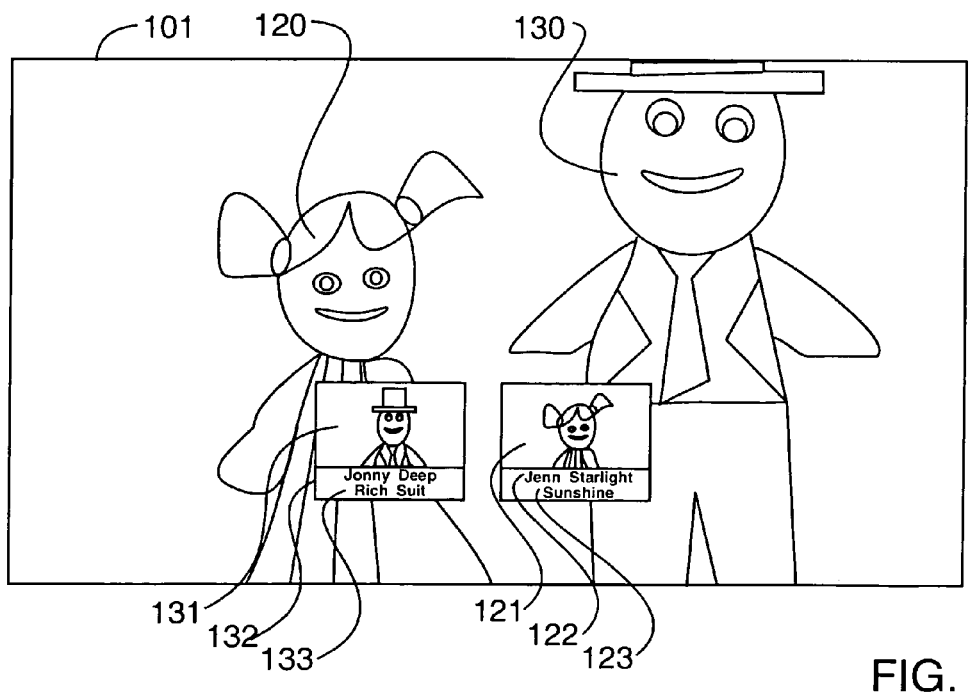
FIG. 1F illustrates a frame accurate embodiment where the display of character/performer identification information is limited to the characters actually depicted in the video frame.

An embodiment that is based on clip definitions offers advantages over an embodiment based on a precise video frame specific identification. A clip based embodiment does not require the user to pause the playing of the video at a video frame depicting the character of interest since it is not dependent on the actual contemporaneous onscreen presence of that character. Nonetheless, precise video frame specific identification, as might be generated by image recognition methodologies, can provide, in an alternate embodiment, the source of character/performer identifying information. FIG. 1F illustrates a frame accurate embodiment where the display of character/performer identification information is limited to the characters actually depicted in the video frame. In this example, since frame 101 does not depict the balloon boy, his character/performer identification information is not displayed. Instead only the girl's 120 character/performer identification information (121, 122, 123), and the man's 130 character/performer identification information (131, 132, 133) are displayed. A frame accurate mapping of information may be adjusted to overcome its limitations by the implementation of algorithms that, for example, address proximity, velocity of shot changes, and/or changes in scenes/chapters. For example, the Who function could utilize the performer/character identification data associated with the current video frame and the data associated with the preceding six seconds of video. The Who function could, alternatively or additionally utilize all the frame data of the video frames that are within a clip definition.

A frame accurate mapping of information can elegantly support a continuous display of identification information contemporaneously with the playing of the video. The display of identification information need not require the pausing of the playing of the video. The Who function may be continuously activated and updated while video is playing and be responsive to an on/off toggle.

Figure 1G:
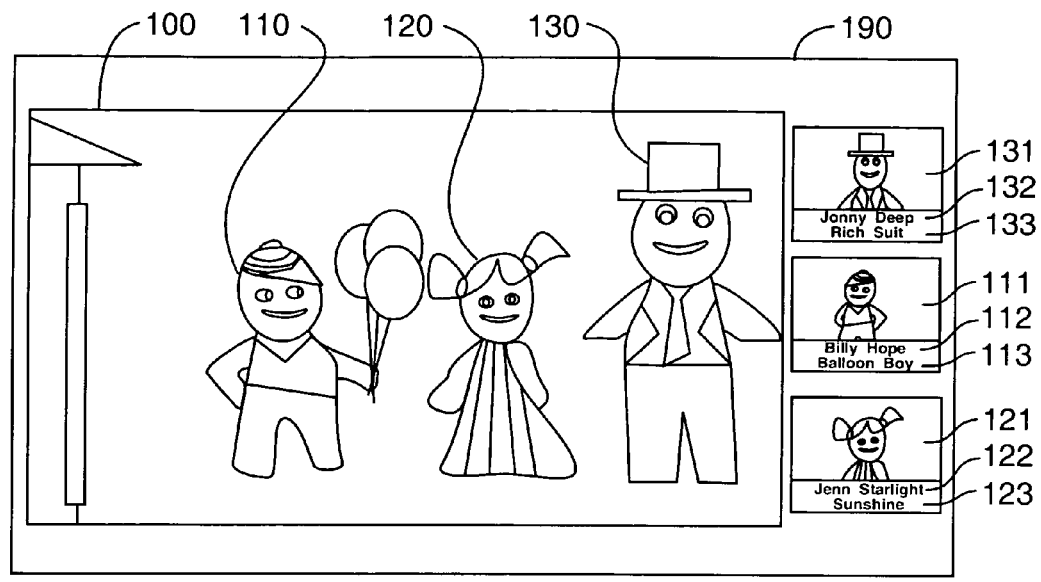
FIG. 1G is a representation of a video screen where the display of character/performer identification is not superimposed on the video.

FIG. 1G is a representation of a video screen where the display of character/performer identification information is advantageously not superimposed on the video. Large screen and monitors 190 can easily accommodate both the continued playing of the video 100 and the display of contemporaneously updated character/performer identification (131, 132, 133; 111, 112, 113; and 121, 122, 123). This display arrangement offers advantages that are independent of whether a video segment or video frame mapping methodology is implemented and whether the display of character/performer identification is contemporaneously updated.

Figure 1H:
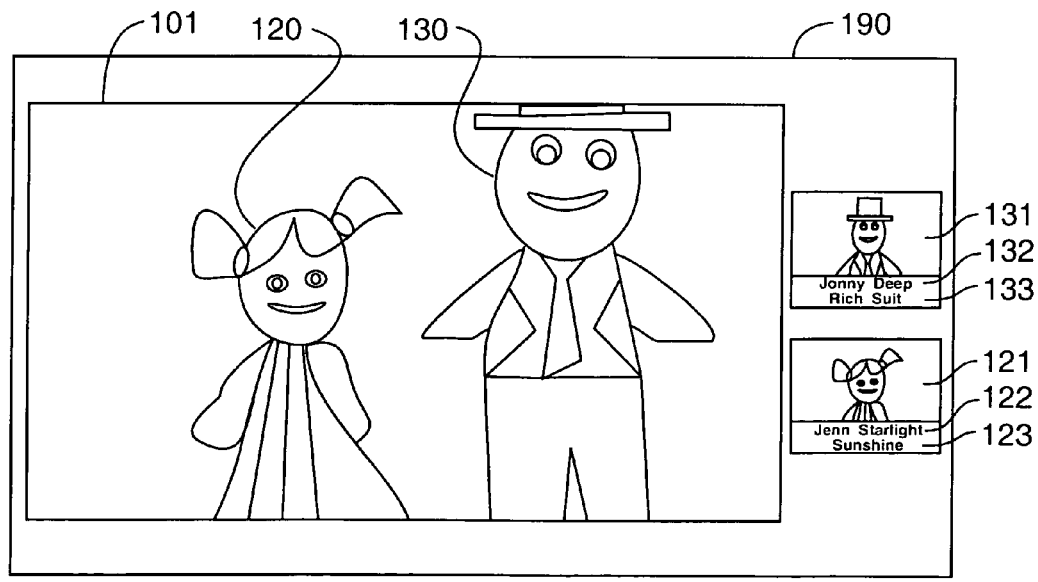
FIG. 1H is a representation of a video screen illustrating in combination with FIG. 1G a continuous display of character/performer identification.

An embodiment that relies on frame accurate character/performer identification information is capable of providing contemporaneously updated frame accurate identification of the character/performer actually depicted in each video frame as the video frame is displayed. As illustrated in FIG. 1G, the video frame 100 played on the screen 190 depicts a boy carrying balloons 110, a girl 120, and a man 130. With the Who function enabled, character/performer identification 131, 132, 133; 111, 112, 113; and 121, 122, 123 are provided. By comparison, in this illustration of FIG. 1H, since the playback of the video has not been paused, a subsequent video frame 101 is played on the screen 190. This particular video frame only depicts the girl 120, and the man 130 characters. Accordingly, as the Who function has not been turned off, the character/performer identification 131, 132, 133; and 121, 122, 123 are only provided for the girl 120, and the man 130 characters. This process of providing contemporaneously updated frame accurate identification of the character/performer would be continued while the video is being played and the Who function is activated.

Figure 2A:
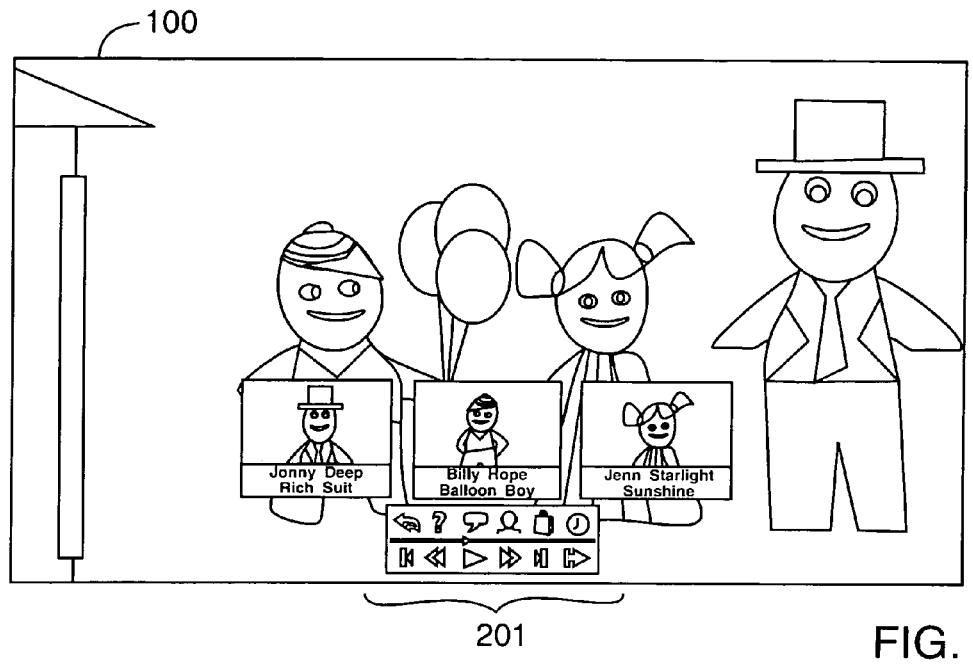
FIG. 2A is a representation of a video frame within a motion picture comprising a playback control panel.

To activate the Who feature, a user may be provided a number of means, including, onscreen playback controls, remote control keys, voice control, other user interfaces, and/or any combinations of these methodologies and means. FIG. 2A is a representation of a video frame within a motion picture comprising a playback control panel 201 as may be advantageously implemented in, for example, a personal computer mouse control embodiment or a touch screen control embodiment. On either embodiment, clicking or touching the lower portion of the screen would cause the display of the playback control panel 201 that comprises a plurality of buttons/objects each associated with a respective event.

Figure 2B:
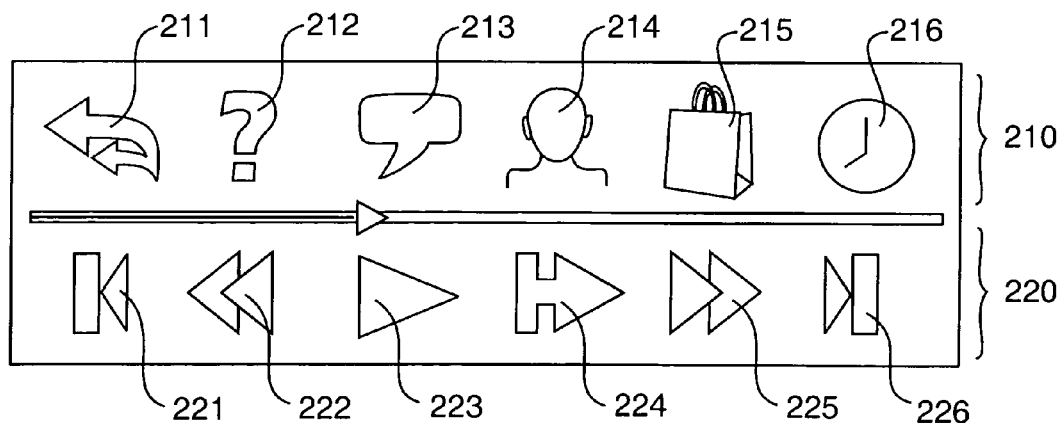
FIG. 2B is a magnified representation of the playback control panel shown in FIG. 2A.

FIG. 2B is a magnified representation of the playback control panel shown in FIG. 2A. The play control panel comprises a plurality of play control buttons/objects 220, such as Skip Back Clip/Segment Set 221, Fast Rewind 222, Play/Pause Toggle 223, Play From 224, Fast Forward 225, and Skip Forward Clip/Segment Set 226. In this example, the play control panel also comprises plurality of function activation buttons/objects 210, such as Exit 211, Help 212, What 213, Who 214, Shopping 215, and Current Video Location 216. Clicking or pressing the Who 214 play control button/object causes the activation of the Who functions.

Figure 3:
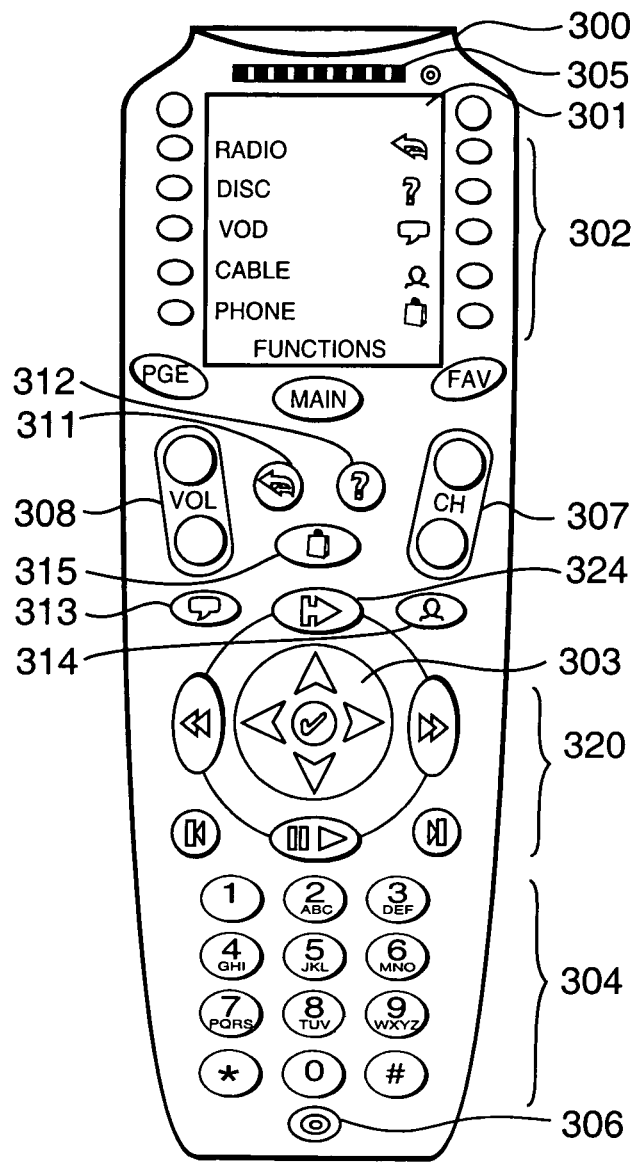
FIG. 3 is an illustration of a remote control device.

A remote control device as per the teachings herein may be based on any number of technologies both wired and non-wired. FIG. 3 is an illustration of a remote control device 300 that, for example, comprises: a display screen 301 that additionally responsibly labels interactively defined function keys 302; screen position and menu controls 303; telephonic alphanumeric key pad 304; speaker 305; microphone 306; channel controls 307; volume controls 308; play control keys 320 (e.g. Pause/Play) and Play From 324. This particular remote control embodiment additionally implements a plurality of dedicated function activation keys, such as Exit 311, Help 312, What 313, Who 314, and Shopping 315.

Alternatively, function activation may be provided by the display screen 301 that would responsibly label interactively defined function keys 302. The interactively defined and labeled function keys permit a reduced set of function keys to provide access to individual sets of multiple functions as is suggested by the illustration.

In particular the interactively defined and labeled function keys may be automatically configured and reconfigured by a specific video transmission or other information downloaded from, for example, the multimedia player. For example, when a specific viewer accesses the remote control, the display may show blinking icons for voicemail and email received for that individual.

Keys may be labeled, and other keys found in the art may be added responsive to the particular requirements of the functions implemented. Further, the capabilities, functions, keys and other elements of a remote control device may be synergistically integrated with a remote keyboard with integrated touch pad and/or pointing device. In such embodiments, the function keys or dedicated keys, for example, may be configured to provide direct access to the various functions.

Figure 4:
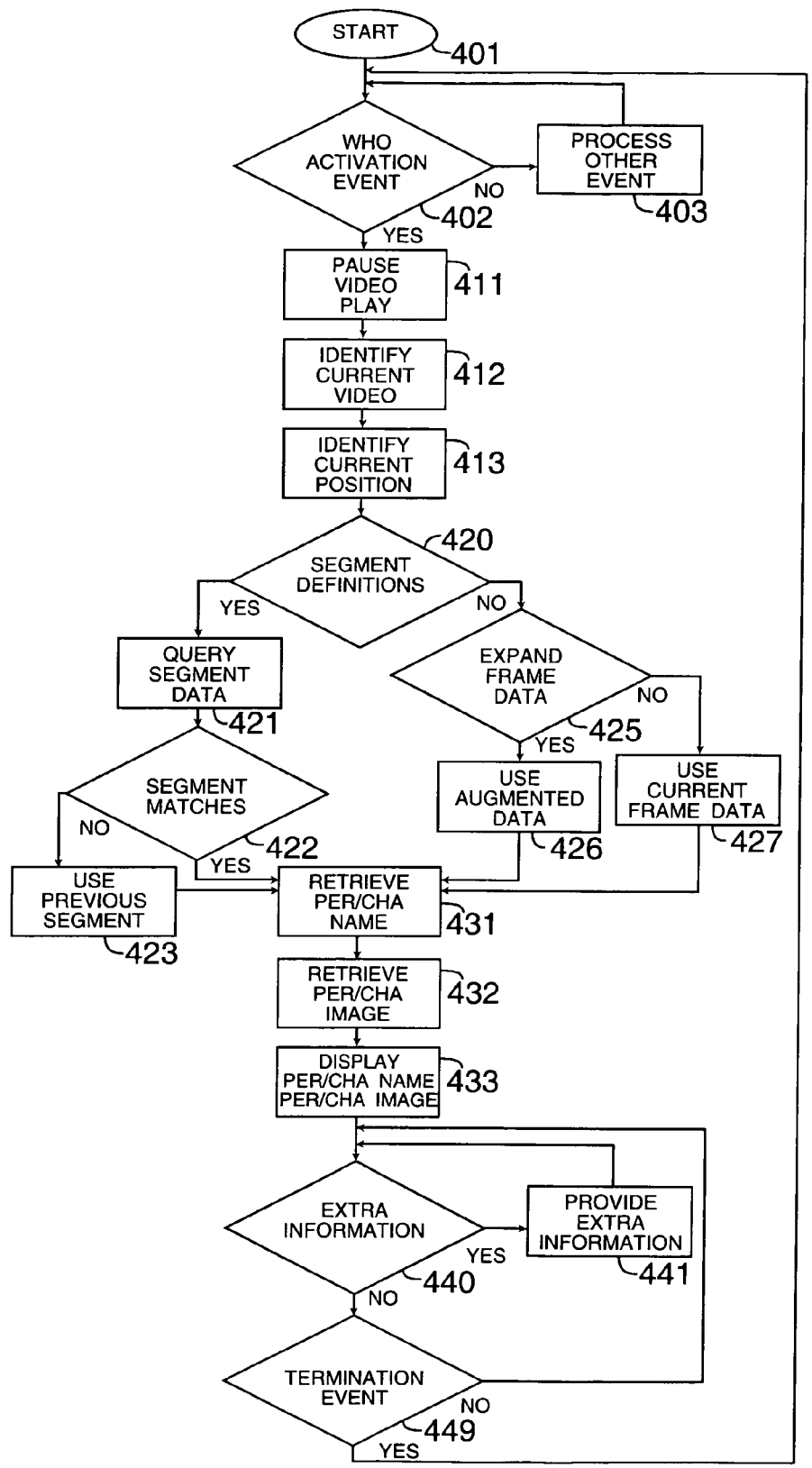
FIG. 4 is a flow chart of a method for providing a user an identification of the performer/character during playback of a video.

FIG. 4 is a flow chart of a method for providing a user an identification of the performer/character during playback of a video. When, during a playing of a video 401, processing software receives a function activation event, it determines whether it is a Who function activation event or not 402. If the Who function activation is not activated, then the appropriate function is processed 403

Optionally, the activation of the Who function causes processing software to automatically pause the playing of the video if not already paused 411. The pausing of the video 411 may be optional as a user may desire that the video continue playing and the Who function would dynamically respond to changes in the current play location. As detailed with respect to FIGS. 1G and 1H a user may prefer to obtain contemporaneously updated frame accurate identification of the character/performer as the video continues to be played. In such cases, user preference would disable the Who function from automatically pausing the playing of the video.

The Who function processing software identifies the current video being played 412; identifies the current location, e.g., time code, frame identifier, or some other indicator of the place or location, within the video at which the video was paused, the Who request was received, or a current changing play location 413. The identification of the current video 412 is material in those situations where the presentation comprises the playing of segments retrieved from within a plurality of videos. If the embodiment relies on segment definitions 420, then the segment information is queried 421 to find the segment that includes the current location within its beginning and ending frames. If a segment definition is not available that includes the current location within its beginning and ending frames or such a segment does not provide performer/character identifying information 422, then an immediately preceding, i.e., play sequence, segment may be utilized 423. In the event that an immediately preceding segment is utilized 423, the video may be automatically rewound to a suitable video frame prior to the display of the identification of the performers and characters.

If the embodiment does not rely on segment definitions 420, then an alternative definition, such as a video frame, may be utilized. An alternative preferred embodiment utilizes the performer/character identification data associated with the current video frame. If, optionally, for example, the data associated with the current video frame is augmented by including the data associated with each of the video frames in, for example, the preceding six seconds of video 425, then the expanded data is utilized 426. Otherwise, the alternative definition, such as the data associated with the current video frame, is utilized 427.

In either embodiment, the segment definition or alternative definition is associated with performer and/or character identifying information and performer and/or character image information which are utilized to retrieve the performer's name and/or character's name 431, and an appropriate image of the performer and/or character 432. The performer/character identifying information, such as the performer's name and/or the character's name together with an image of the performer and/or character to enable visual identification by the user are displayed 433. The segment information or alternative definition information provide a reference to enable a retrieval of a visual depiction of the performer and/or character. For example, in the case of a character, the reference to a visual depiction would identify a video frame within the video that can be used to pre-extract an image of the character and store in volatile or non-volatile memory for use when needed, or the character image may be extracted from within the video following the Who activation. The character image may be provided by a source other than the source of the video, and the reference may comprise data, e.g., a link to a website, to enable retrieval. Similarly, in the case of a performer, the reference to a visual depiction may identify a location in the source of the video (e.g., the DVD) where a suitable image may be provided that can be retrieved and pre-stored in volatile or non-volatile memory for use when needed, or the performer image may be extracted from within the video following the Who activation. Alternatively, the image of the performer may be provided by a source other than the source of the video, and the reference to a visual depiction of the performer may comprise data, e.g., a link to a website, to enable retrieval from that source.

If a performer/character is associated with additional information 440, the extra information may be provided to the user at this point 441. Otherwise, the Who function is terminated by an appropriate user termination event 449, e.g., a play request or escape request. Performer/character extra information may comprise a brief biography, a list of other videos that may be available, e.g., a filmography, a fan site, personal information, public appearances, and/or information internal to the video and specific to that performer/character, such as the performer/character's best lines, subjects, memorable moments, etc. A variety of methodologies may be implemented to enable the user to activate the extra information 441 features. For example, the identification of the performers and/or characters may constitute a button/object associated with a "clickable" event that when activated would launch the extra information routines.

Dependent on the particular embodiment, the pausing of the video 411 and/or identification of the current location 413 may be responsive to a user's preestablished delay adjustment preference, such as, a user's specific previously defined amount of time, e.g. 10 seconds to allow for delays by the user to activate the Who functions. Herein, whether a user's preference or a system's preference, preestablished means that the amount is not dependent on a user's action at the time of the request. Preestablished does not necessarily mean that the preference is not responsive to the particular segment being played. In those instances that the playing of the video is voice controlled, separate default values may be established to accommodate the fact that user may be more likely to say Who faster than to be able to press a Who button on a remote control specially while viewing a full length motion picture. In a preferred embodiment, rather than a user configuring the system at the time of installation or a first playing, autoactive software routines would learn the user's preferences from the user's actions, and adjust the various settings accordingly.

The flow chart of FIG. 4 is intentionally drafted to disclose a number of possible embodiments. A number of permutations, combinations, substitutions in the specific steps, and recursive functions may be initiated at different points in the process than those illustrated. Further, the detailed disclosure with respect to FIGS. 1A-1H offer additional elements that may be synergistically implemented in one of many possible embodiments.

An embodiment of the system and method of the present invention comprises: (i) defining segments within a video responsive to the depiction of a significant or noteworthy character and/or performer; (ii) identifying the performer(s) and character(s) that may be present in the segment; (iii) associating with identified characters a reference to a video frame from within the video preferably depicting a 2T-shot of a single character; and (iv) creating a video map comprising the segment definitions, identifications, and references. In one such embodiment, the video is a full length theatrically released motion picture, the segments are clips, and the identifications and references would enable an identification of the performer(s) and character(s) that may be depicted in an individual clip within the video. An example of alternative embodiments of the system and method of the present invention comprises: (i) identifying the performer(s) and character(s) that may be present in each of a plurality of video frames; (ii) associating with an identified performer a reference to a source of a visual depiction of the performer; and (iv) creating a video map comprising the identifications and references. In one such embodiment, the video is a full length theatrically released motion picture, and the identifications and references would enable a contemporaneously updated frame accurate identification of the character/performer actually depicted in each video frame as the video frame is displayed. These two examples suggest other possible embodiments resulting from the possible combinations and substitutions of the elements.

In an embodiment of an apparatus capable of processing a video map or, more specifically, data, the data comprises a plurality of segment definitions each defining a video segment within a video. The term segment refers to one or more video frames. A video frame is any image or partial image in any digital or analog format comprising, for example, a frame of video, a video field, an I, B, or P frame. A video frame may comprise audio information. A segment definition defines a beginning and ending of a segment within a video. A segment comprises, for example, a chapter, scene, clip, a segment depicting an item, act, and/or dialog. A beginning and ending of a segment may be defined by a variety of means including, for example, time codes in a seconds and milliseconds format or an HH:MM:SS:FF (Hours, Minutes, Seconds, and Frames) format, bit positions, logical positions identifiers, or any format that can consistently accurately identify a location or position in a video.

The data further comprises a name of a character depicted within a defined video segment. In other words, the data provides the means for identifying characters that are depicted within a video segment. This is accomplished, by for example, directly associating a character's name with a segment in which the character is depicted or associating a reference, to a character's name, with a segment in which the character is depicted.

The data further comprises a name of a performer of a depicted character. As previously defined, the term performer refers to an individual, participant, actor, or actress, appearing in a video and/or credited for the physical and/or the verbal performance of a character. A performer refers to, for example, an actor in a motion picture, an athlete in a televised sporting event, a newscaster in a news program, and a chef in a cooking show. Accordingly the data provides the means for identifying who are the performers of the characters that are depicted within the video. This is accomplished, by for example, directly associating a performer's name to a character's name or associating a performer reference, to a character's name or reference.

The data further comprises a reference to a visual depiction of a depicted character. A visual depiction is any image or representation in image form, irrespective of the source, motion, quality, or relative size. A depicted character is a representation of a character in image form. A reference is any means that enables retrieving a visual depiction. A reference comprises, for example a direction, pointer, instructions, location to a source within the video, associated with the video, external to the video, remote to the video, or unrelated to the video. In a preferred embodiment, the reference to a visual depiction of a character comprises a time code (e.g., HH:MM:SS:FF) to a location within the video from which a depiction of the character may be extracted. Alternatively, for example, the reference to a visual depiction of a character comprises a link to an image available at a website or webpage.

The data further comprises a reference to visual depiction of a performer of a depicted character. Similarly as in the case of a visual depiction of character, a visual depiction of a performer is a representation of a performer in image form. A reference is any means that enables retrieving a visual depiction. A reference comprises, for example a direction, pointer, instructions, location to a source within the video, associated with the video, external to the video, remote to the video, or unrelated to the video. In a preferred embodiment, the reference to a visual depiction of a performer comprises a time code (e.g., HH:MM:SS:FF) to a location within the video from which a depiction of the performer may be extracted. Alternatively, for example, the reference to a visual depiction of a performer comprises a link to a publicity headshot available at a website or webpage. It should be appreciated that a visual depiction of a performer need not be more than an image of the performer performing the character which may be extracted from within the video as in the case of a visual depiction of character.

In such an exemplary embodiment, the apparatus performs the step of receiving, from a user, during a playing of a video, a request for information for identifying a performer of a character that is depicted during the playing of the video. As is, for example, detailed with respect to FIG. 2A, FIG. 2B, and FIG. 3, a user has a number of different ways of sending or transmitting a request for information to identify a performer and/or character. These include, for example, onscreen playback controls, remote control keys, and voice control. Accordingly receiving a request comprises being responsive to requests transmitted or sent by means of such user interfaces. Information for identifying a performer of a character include, for example, the name of the performer that performs the character and a visual representation of the performer that performs that character.

The apparatus further performs the step of identifying a current location in the video. A current location in the video may be approximately the location in the video when the request for information for identifying a performer was received, a location in the video where the play of the video is paused, and/or any currently identifiable location in the video during playback of the video. A location in the video may be identified by a variety of means including, for example, time codes in a seconds and milliseconds format or an HH:MM:SS:FF (Hours, Minutes, Seconds, and Frames) format, bit positions, logical positions identifiers, or any format that can consistently accurately identify a location in a video. A location may also be referred to as a position or place.

The apparatus further performs the step of identifying a segment definition that includes the identified location. Identifying a segment definition that includes the identified location comprises, for example, comparing the time code of the identified location and finding a segment definition whose beginning time code is the same or earlier than the time code of the identified location, and whose ending time code is the same or later than the time code of the identified location. Simply, the time code of the identified location would be between the beginning and ending time codes of the segment definition.

The apparatus further performs the step of identifying a name of a character depicted within a video segment defined by the identified segment definition; and identifying a name of a performer of the depicted character. These steps utilize the data comprising the name of a character depicted within a defined video segment and the name of a performer of a depicted character. Similarly, the apparatus utilizes the data to retrieve, responsive to the reference, a visual depiction of the depicted character; and to retrieve, responsive to the reference, a visual depiction of the performer of the depicted character. The term retrieve should be understood in the broadest sense and comprises obtain, acquire, procure, download, transfer, extract, and to come into possession by any means or methodology.

In this embodiment, the apparatus further performs the step providing, the user, the identified name of the depicted character, the identified name of the performer of the depicted character, the visual depiction of the depicted character, and the visual depiction of the performer of the depicted character.

As previously detailed, the apparatus may additionally retrieve and provide, the user, a filmography corresponding to the performer of the depicted character. In this context the term filmography should be understood as comprising any extra information, data, depiction, and/or video relating to the performer A filmography corresponding to the performer comprises, for example, a brief biography, a list of other videos that may be available, e.g., a filmography, a fan site, personal information, a schedule of public appearances, and/or information internal to the video and specific to that performer performance of a character, such as the character's best lines, subjects, memorable moments, etc.

In still another embodiment of an apparatus capable of processing data, the data comprises a name of a performer of a character depicted within a video frame of a video; and a reference to a visual depiction of the performer of the depicted character; the apparatus performs the steps of receiving, from a user, during a playing of a video, a request for information for identifying a performer of a character that is depicted during the playing of the video; continuously identifying a current location in the video; continuously identifying a name of a performer associated with the continuously identified location; retrieving, responsive to the reference, a visual depiction of the performer; and contemporaneously updating and providing, the user, the identified name of the performer and the visual depiction of the performer as the video continues to be played.

The creation of the information in a video map supporting the Who feature may be guided by written guidelines and data formats ("specifications") that facilitate standardizing the methodology implemented in defining segments and assigning descriptors. Use of the specifications enhances the effectiveness of the Who function. In a preferred embodiment, the creation of segments definitions is executed by a trained specialist ("mapper") guided by the specifications to create consistently elegant definitions of segments and identification of characters and performers. A mapper has the advantage, over currently feasible automated systems, of being capable of providing qualitative differentiation and the capability to research external sources of information.

Specifically, in a preferred embodiment, the specifications for the Who function consists of the clip definition included herein, the instruction to select, where possible, a suitable 2T shot of the character as an identifying image, and one of many possible data formats detailed further below. As previously detailed, A "clip" is a segment that is smaller than a chapter and usually smaller than a scene. A clip includes one or more contiguous shots, and usually depicts the same primary characters within a location. A clip's definition is responsive to a material change in the participation of the principal characters, a material change in location, and/or a distinct change in thematic content or topic of conversation. Clips, as defined herein, offer advantages not present in segment definitions based on chapters or scenes, which are much broader and lengthier than clip and do not elegantly serve the objectives of the Who function. There are 36 chapters in the motion picture "Matrix Reloaded" with an average length of 230 seconds. By contrast, in that video, there are approximately 245 clips with an average length of 34 seconds. The definition of clips is particularly advantageous when creating segment definitions for thematically interleaved content such as in the case of the dance/sex scene in chapter #8 of the motion picture "Matrix Reloaded". In that instance, rather than a segment defined by the chapter or by the interleaved scenes, a clip provides a more narrowly defined set of identified performers/characters. Further, a clip associated with identification information may be congruent in one or more frames with a clip associated with different identification information.

As previously indicated, a video map comprises, for example, a combination, arrangement, table, listing, tables and fields, database, metadata, or xml file, or other data comprising segment information. Accordingly, segment information may be provided by a variety of data formats. Means for storing segment data comprise, for example, a text or flat file, an xml document, and/or fields and tables in a database. The data format example that follow illustrate, by way of example, that there are many design choices that are available in drafting of the specifications' guidelines and data formats, and the corresponding processing software and data query routines. For example, a "string" data format may require that: (i) the first letter in each word in a name of a performer or character is capitalized; (ii) a period (".") connects the first name to the last name; (iii) an equal symbol ("=") separates and establishes the relationship between a Performer's name and a character's name; (iv) the performer's name precede the character's name; (v) a bracket ("[ ]") separates a performer's, and/or a character's name from other keywords; (vi) the bracket precedes and follows the performer's/character's name; and (vii) the performer's and character's name precede any additional terms or keywords that may be included in the string. For example, in a scene of the motion picture "Matrix Reloaded", the characters Morpheus and Commander Lock are speaking about the character Neo being "the One." The string data format would look as follows:

[Lawrence.Fishburn=Morpheus]
[Harry.J.Lennix=Commander.Lock]Neo.

In this example, since Neo is not depicted in the clip, the clip would only provide "Lawrence Fishburn as Morpheus" and "Harry J. Lennix as Commander Lock" to a Who function. A text file embodiment limited to performer/character identification information may, for example, comprise the following elements:

CHA20="Carrie Ann Moss as Trinity" PIC=20557
CHA45="Matt McColm as Agent.Thompson" PIC=35257
Segment 92, 01:52:20:17, 01:52:41:14, CHA20, CHA45

An xml embodiment limited to performer/character identification information may, for example, comprise the following elements:

<Segment>
<SegID>92</SegID>
<SegBegTime>01:52:20:17</SegBegTime>
<SegEndTime>01:52:41:14</SegEndTime>
<SegCharacter>20</SegCharacter>
<SegCharacter>45</SegCharacter>
</Segment>
<Character>
<ChaID>20</ChaID>
<ChaName>Trinity</ChaName>
<Pername>Carrie Ann Moss</ChaName>
<ChaPic>20557</ChaPic>
</Character>
<Character>
<ChaID>45</ChaID>
<ChaName>Agent Thompson</ChaName>
<Pername>Matt McColm</ChaName>
<ChaPic>35257</ChaPic>
</Character>

The data formats that are implemented in the text file enable software routines to extract from the text file illustration the same information that may be provided by the xml illustration. Similarly, a database embodiment limited to performer/character identification information may, for example, comprise the following database table, and fields (data types):

Segments
SegID (AutoNumber)
SegBegTime (Number)
SegEndTime (Number)
ChaID (Number)
ChaFirst (Alpha)
ChaMiddle (Alpha)
ChaLast (Alpha)
ChaPic (Number)
PerID (Number)
PerFirst (Alpha)
PerMiddle (Alpha)
PerLast (Alpha)

Notwithstanding the simplicity of the illustrative database embodiment, in a preferred embodiment segment information comprises such tables, fields, indexes, and relational relationships to suit particular data and retrieval performance objectives.

Mapping a video need not be the product of one or more specialists, a preferred embodiment may implement a community supported methodology. Enhancing the richness of the mapping of segment while retaining a consistent and efficient coding may be accomplished by managing the contributions by a community supported methodology. The advantage of a community supported methodology is the potential to maximize the number of performer/characters that are correctly identified. In a community supported methodology, a user with specific expertise in a motion picture may contribute to the identification of an extra in the motion picture. This contribution may be internally reviewed by a mapper or quality control supervisor, and/or be externally reviewed by the user community. Adherence to the requirements of the specification and data formats promotes the effectiveness of the architecture. The online encyclopedia "Wikipedia" provides one of a number of community supported methodologies that serve as a production model. End user contribution may be encouraged by the dynamics of its economic model. Additionally or alternatively, end user contribution is directly compensated by, for example, monetary payments, or indirectly compensated by, for example, the issuance of video content access minute credits in proportion to the value of the amount of the contribution.

Figure 5:
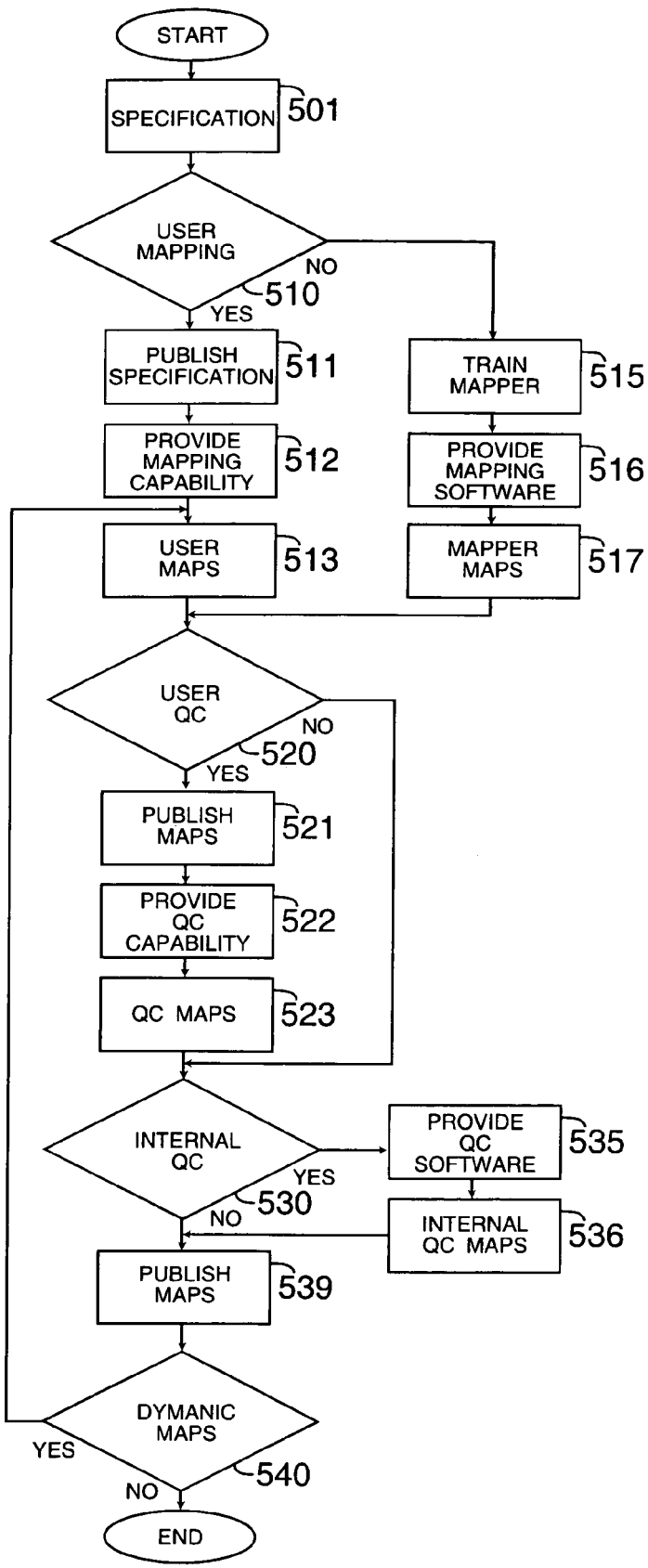
FIG. 5 is a flow chart of a method for creating video map.

FIG. 5 is a flow chart of method for creating a video map. In those embodiments, where a map creation process comprises the use of specifications, a video map production methodology comprises steps of drafting a specifications 501 and publishing, internally and/or externally, the specifications 511. If a user collaborative methodology is implemented 510 alone or in combination with other methodologies, then it is advantageous to publicly publish the specifications 511. Alternatively, no specification is provided, and the user collaborative methodology is left to directly or indirectly develop its own specifications. Alternatively, in cooperation with such collaborative methodology, exemplary video maps may be published to serve as the specification to enable the community to proceed with video map production.

In a collaborative implementation of a preferred embodiment, the user community may be provided with mapping capability, e.g., software, 512 that facilitates the drafting of maps by users 513. Alternatively, or in cooperative combination with such collaborative methodology, e.g., trained mappers 515 which have specialized mapping software 516, can create draft video maps 517. If neither the users 520 nor an internal staff performs quality control ("qc") 530, then the video maps produced by either the users 513 or the mappers 517 are published to end users 539 for use. If, as in other collaborative methodologies, users here also provide quality control 520, then work product of the users and/or the mappers, as appropriate is published 521 for purposes of quality control.

Users are provided with quality control capability 522 that enables them to provide quality control for video maps 523. Alternatively, or in cooperative combination with such collaborative methodology 530, mappers perform, with the aid of quality control training, software, and systems 535, an independent or dependent quality control of the video maps 536. Video maps that have undergone quality control at the external user level 523 or at the internal mapper level 536 are in due course published 539 for use by the end users. Published video maps 539 need not remain static, instead, advantageously, video maps after they are published, and while substantially completed, are viewed as work in progress 540. This would enable the end users and/or mappers to enhance video maps over time.

Notwithstanding the particular disclosure with respect to FIG. 5, a particular video map production embodiment need not produce all of the definitions and descriptors required to support all of the features detailed herein or incorporated herein by reference, and a video map need not be responsive to any specification and/or data format. As described above, a video map need only consist of information directly or indirectly identifying a beginning and ending of one or more segments, and one or more descriptors that may be necessary to support the Who function. Thus, in certain embodiments, the steps of drafting a specification 501 and publishing the specifications 511, among other steps, may be omitted. Further, a particular set of steps of the video map production methodology may be used for one feature, e.g., the Who function, and a different set of steps of the video map production methodology may be used for a different feature, e.g., Shopping.

The flow chart of FIG. 5 is intentionally drafted to highlight the principal objects of a map creation methodology. As is above detailed, a number of permutations, combinations, and substitutions in the specific steps are possible. Further, recursive functions may be initiated at different points in the process than those illustrated. Still further, while for purposes of illustration terms such "user", "mapper, "capability", "software", "internal" and "external" are utilized to suggest useful distinctions, clearly a user that produces a video map is a mapper, and such user may use software and/or other capabilities to collaborate in the drafting of, or in the quality control of, a video map.

Preferred embodiments of the various inventive elements disclosed herein utilize a multisource receiver transmitter multimedia player comprising synergistically integrated random access and communications capabilities. The multimedia player comprises the various functions, capabilities and components of a variety of consumer electronic systems including, for example, an optical player and a gaming system, e.g., Sony PlayStation 3; a video recorder, e.g., 300-hr TiVo® Series3™ HD Digital Media Recorder; a set-top box capable of retrieving video-on-demand services from a remote video services provider, e.g., a Scientific Atlanta Explorer 8000; a multimedia computing device, e.g., Gateway FX530XM; and a full-featured editing system, e.g., Avid Xpress Pro. The teachings of such devices are incorporated herein by reference.

A multimedia player permits a user to obtain videos, multimedia, and other services from storage means within the multimedia player, sources locally accessible, and/or from a remote services provider. Additionally, the multimedia player, as per the various inventions detailed herein, comprises the means and operational methods of, for example, (i) customizing a playing of a motion picture stored in an optical readable disc; (ii) time shifting and customizing the playing of a motion picture obtained from, for example, a DBS transmission; (iii) integrating communications (e.g. phone answering) with a playing (e.g. auto-replay) of a motion picture; and (iv) auto-configuring a host multimedia player.

Figure 6:
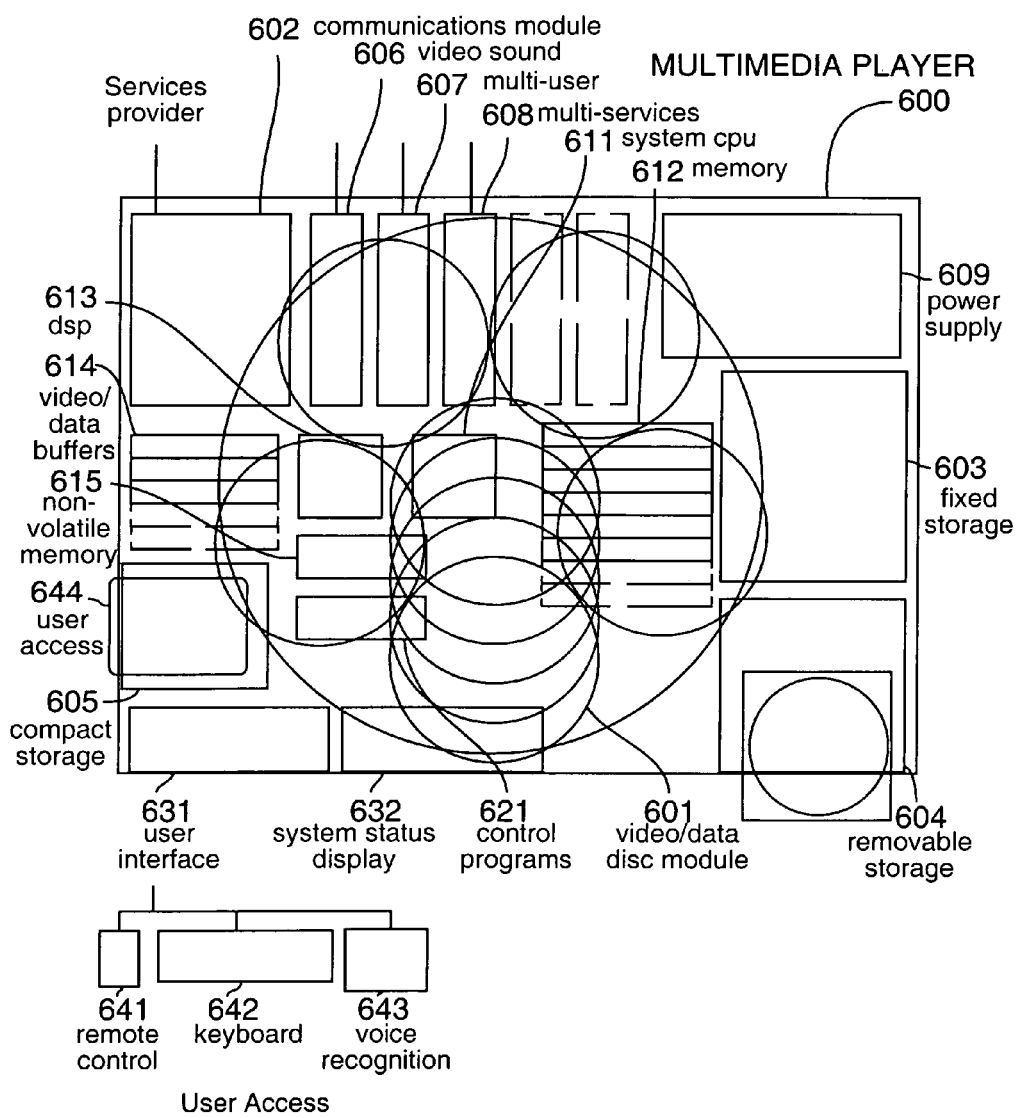
FIG. 6 is a schematic diagram of a multisource receiver transmitter multimedia player.

FIG. 6 is a schematic diagram of a multi-featured multimedia player 600 comprising the following primary modules and subsystems: i) random access video/data disc module (e.g. a multi-disc optical read/write drive) 601; ii) communications module 602; iii) fixed storage subsystem 603; iv) removable storage subsystem 604; v) compact portable storage subsystem 605; vi) external video/audio input/output support module 606; vii) multi-user modules 607; and viii) multi-services modules 608.

The communications module 602 may be as simple as a modem card or device, or as sophisticated as may be required by a direct fiber optic access to a remote video and communication services provider. The communications module may support a plurality and variety of wired and wireless connections to access a variety of networks. Additionally, the communications module may support a plurality of competing broadcasts and on-demand video delivery systems. In this fashion by merely depressing the appropriate keys in a remote control device a user can easily switch between off the air transmissions and on-line services. By this method a video services provider can satisfy a wide range of video requirements without necessarily utilizing video-on-demand system capacity. In such instances a multimedia player may be connected to a local receiving means. The receiving means may be, for a example, an indoor antenna, an outdoor antenna, an existing system, such as the electrical system, that may serve as an antenna, or a local media server.

The fixed memory subsystem 603 refers to any nonvolatile memory storage device principally utilized to randomly read/write and store significant quantities of information. An example of a fixed memory storage subsystem is a personal computer's hard disk drive.

The removable memory subsystem 604 refers to any nonvolatile memory storage device principally utilized to transport information to and from two similarly equipped devices. Examples of removable memory storage subsystems are electronic memories and removable hard disks. Electronic memories comprise, for example, USB flash drives. The random access disc module 601 is another example of a removable storage subsystem.

The compact portable storage subsystem 605 and user access media 644 is principally distinguished from a removable storage subsystem 604 by the size of the media and the greater variety of memory storage technologies that are generally implemented. Nonetheless, some of the removable storage media, such as for example a flash drive, are also considered user access media 644. Examples of other removable storage media and user access media are: laser read/write cards, in which at least one surface of the card permits a laser to read/write information; electronic cards, in which the information is stored in electronic components; magnetic cards and drives embodying magnetic storage technology, electronic memories and cartridges.

Clearly, a variety of memory devices are available utilizing technologies and combinations of technologies to suit particular performance requirements. The above classifications of the memory devices are directed at bringing attention to functional capabilities of a multimedia player rather than to a particular technology. The classifications are not intended to restrict a subsystem to a particular classification, limit the selection of subsystems which may be implemented, or to limit the function of the particular subsystem implemented.

It is intended that a full featured multimedia player additionally "play" a variety of laser readable media, such as, Blu-rays, DVDs, CDs, photo CDs, and interactive videos and games, in a conventional manner. The wide range of video/data discs that may be accommodated and the various configurations are diagrammatically emphasized in FIG. 6 as the five stacked circles and the five circles inside the representation of the video/data disc unit 601.

The external video/audio input/output support module 406 supports video/audio/data transmission to the primary video display system comprising, for example, a monitor/television, stereo system, and keyboard/voice recognition-response. Additionally, the input/output module supports video/audio input from local sources such as for example video cameras, and videophones. The construction of the external support module follows the conventional practices of consumer electronic products as for example: optical disc players, recorders, and personal computers.

Multi-user modules 607 principally support separate controlled independent access by other users of the multimedia player's processing, video, and communications resources. The construction of multi-user modules following established networking technologies.

In a preferred embodiment, instead of utilizing one of the Windows operating systems, the multimedia player will incorporate a small footprint multi-user multitasking realtime operating system with a streamlined user interface patterned after, for example, the simpler interface of a cable receiver. A multi-layer approach to the functionality/complexity of such functions as surfing the net; contact management and email, optical disc/internet hybrid games, applications and services; video editing; multimedia and word processing; and portfolio management and banking, are made available at a streamlined level that provides functionality required by most users at a markedly reduced level of complexity.

Multi-services modules 608 provide a host of services, such as for example residential security, and appliance operation management. The operation of the module being principally a software application running under the multi-user operating system implemented. The construction of the particular multi-service module is responsive to the particular application.

The multimedia player further comprises computing elements and video processing elements readily found in multimedia devices and video electronic systems such as, for example, and not limitation, microprocessor 611, memory units 612, video processor or digital signal processor 613, video, audio, and data buffers 614, and nonvolatile memory 615. The video audio module or board 606 and the video processor 613 comprise compression-decompression technologies to both retrieve and decompress videos and compress and transmit videos. The compression technologies may include hardware, firmware, software, or any combination of these. One or a plurality of existing and forthcoming video compression methods may be implemented such as: Motion-JPEG, MPEG 1, MPEG 2, Fractals, Wavelets, and MPEG 4.

A multimedia player's control programs that manage the multimedia player's resources, and the retrieval and processing of data and video information, reside in dedicated chips 621. Alternatively, or additionally, control programs are stored in mass memory devices 603 from installed or downloaded software, in removable memory media 604, or in a user access media 644.

A multimedia player's user control interface 631 includes communications to the buttons and keys located on the cabinet of the device, and to the associated control devices 641-642-643. The keys, buttons, and switches, conventionally found in consumer electronic systems and deemed advantageous to the operation of the multimedia player may also be implemented. These controls are further augmented by a plurality of function comprising: segment skipping control, magnification controls, content preferences control, video map control, and system menu control. The user control interface 631 additionally supports infrared and/or RF remote control units 641, e.g., numeric control pad, keyboard with a touchpad, and game controller; wire connected control units 642, e.g., cable connected computer keyboard, mouse, and game controller; a voice recognition unit 643; and touchscreen capability. A remote control 641 may also include any device, such as a smart phone or pad, that may be synergistically integrated to support functions and features disclosed and/or incorporated herein by reference.

The keyboard, similar to a personal computer implementation, facilitates system setup, keyword retrieval, and system functions requiring the entry of alpha characters. Since a preferred configuration of a multimedia player comprises significant multimedia capabilities, a keyboard pointing means is advantageous. A keyboard connector used to connect a standard AT keyboard or a dedicated keyboard is supplied. Alternatively, an infrared-based or radio-based keyboard is implemented. Further, given the computing and storage capabilities of multimedia player, a voice response subsystem option accommodating at least the few commands, such as play, stop, mute, audio, skip, required to control the basic operations can additionally be provided. The sophistication of the voice recognition capability can be enhanced as the hardware/software configuration of the multimedia player advances within mass market price points.

Implemented in the multimedia player is a digital system status display subsystem 632, which provides visual feedback and system status information similar to the implementations in video playback devices.

In general, parts, subassemblies, and components of a multimedia player are of conventional characteristics and are freely substituted by like functioning elements and components. For example, and not limitation, while fiber optic-based communications are preferred, copper phone lines and coaxial cable-based communications are considered less capable functional equivalents. Additionally, a certain degree of redundancy of components is illustrated in FIG. 6 to schematically show and detail significant functions.

Clearly, redundant components, in general, and redundant electronic components, in particular, are intended to be eliminated in a preferred embodiment. For example, while a multimedia player may include a removable memory subsystem and a compact memory subsystem, one may be the functional equivalent of the other, and one or the other may be eliminated. In general, where cost effective, components are designed to serve a combination of functions.

Further, the configuration of the multimedia player's various modules, components, and subsystems, are intended to offer flexibility analogous to that found in a personal computer. Specifically with respect to the multi-user capabilities, a multimedia player may be configured, for example, with more than one optical module, whether inside the primary cabinet or in a mating or sister cabinet. Various embodiments of multimedia players do not include all, or even most, of the means, and/or capabilities detailed herein. The particular configuration of a multimedia player is responsive to the particular functions or features desired.

Responsive to user friendliness, a more advanced wireless plug and play communications and power motherboard and cabinet design is preferred. The motherboard and cabinet would permit the replacement of, for example, the power supply 609 just as easily as a battery is replaced in a portable personal computer. In a preferred embodiment of a multimedia player, every component and subsystem is added or replaced without resorting to screwdrivers and the need to unplug and plug communications and power cables.

Generally, in, for example, an optical disc implementation, the entire variable content video (video/audio and video map) is provided in a format similar to that required by the video images contained in the disc. Specifically, in a DVD implementation, the video map is included in a digital format and the video content is included in a digital compressed format in one or more spiral tracks. A video map may be provided with, or separate from, the video's video and audio data. For example, a DVD may comprise, as part of its manufacturing, a prerecorded video and a corresponding video map whether separate from video frames or interleaved among video frames. In the case of preexisting DVDs, the performer/character identification data is required to be provided by a source other than the DVD. Clearly, the playing of a DVD is not technically limited to the manner prescribed by the widely accepted DVD specifications.

Alternatively, the video map and other data may be separately provided by a removable memory media, an user access media, or downloaded by means of the communications interface. For example, a multimedia player simply configured and comprising, a DVD drive and a flash drive or modem provides editing and retrieval benefits for DVDs storing a conventional linear video. Additionally, the drive may serve to store a user's generalized or video specific video content preferences. Conventional linear video programs provide a library of motion pictures to which the teachings herein may be applied.

In those instances where the authoring of the video did not include the production of a video map, the map may be retrieved from a source, e.g., a web site, other than the source of the video, e.g. an optical drive or a remote video provider. In this embodiment, a video map, user interface and other control programs particular to the motion picture may be downloaded by the internet from a remote map server or other multimedia player. Upon a playing of a video, the control program causes the reading of the video's identifier from the video source 601, searches the mass memory fixed storage device 603 for a video map and if not available communicates with an external source to download the appropriate map.

With respect to control programs, scheduling routines, user preferences, video map, and other principally software elements, it is noted that these may be separately or jointly stored in any one of a multimedia player's various firmware/hardware memory devices. For example, the user's content preferences are stored in nonvolatile resident memory 615, in the memory of the fixed or removable memory subsystem 603/604, a user's optical read/write access card or electronic memory card 644, or from the respective read/write video/data disc 601. In an interactive video game application, data, in general, and game software, in particular, for example, may be downloaded to the hard disk, reserving subsequent access of the optical disc for video/audio retrieval. A multimedia player's processing of the control programs 621 is principally a function of the system CPU 611 and system RAM 612.

A variable content video, segment information, play routines specific to the video, and control codes for automatically configuring or controlling the functions of the multimedia player may be provided by means of a variety of existing and evolving technologies. In addition to the hard formats such as tape, optical disc, optical/magnetic disk, memory chips and modules (e.g. RAM, DRAM, high capacity flash memory, bubble memory); a video may be provided by soft formats such as may be implemented in a variety of communications networks utilizing for example analog or digital cable transmissions, fiber optic transmission, phone and satellite communications. A multimedia player need not be physically accessible by a user or be physically located near a display device or a television set. The multimedia player may provide a user access to remote video resources and may itself be remotely controlled by the user. Fiber optic and coaxial communications easily permit the required transfer rates over long distances between controllers, multimedia players, other video sources and displays.

It is within a network-based implementation, that the various advantages and capabilities of the preferred embodiments are realized with respect to the specific hardware technologies and architectures of an underlying video delivery system.

Figure 7:
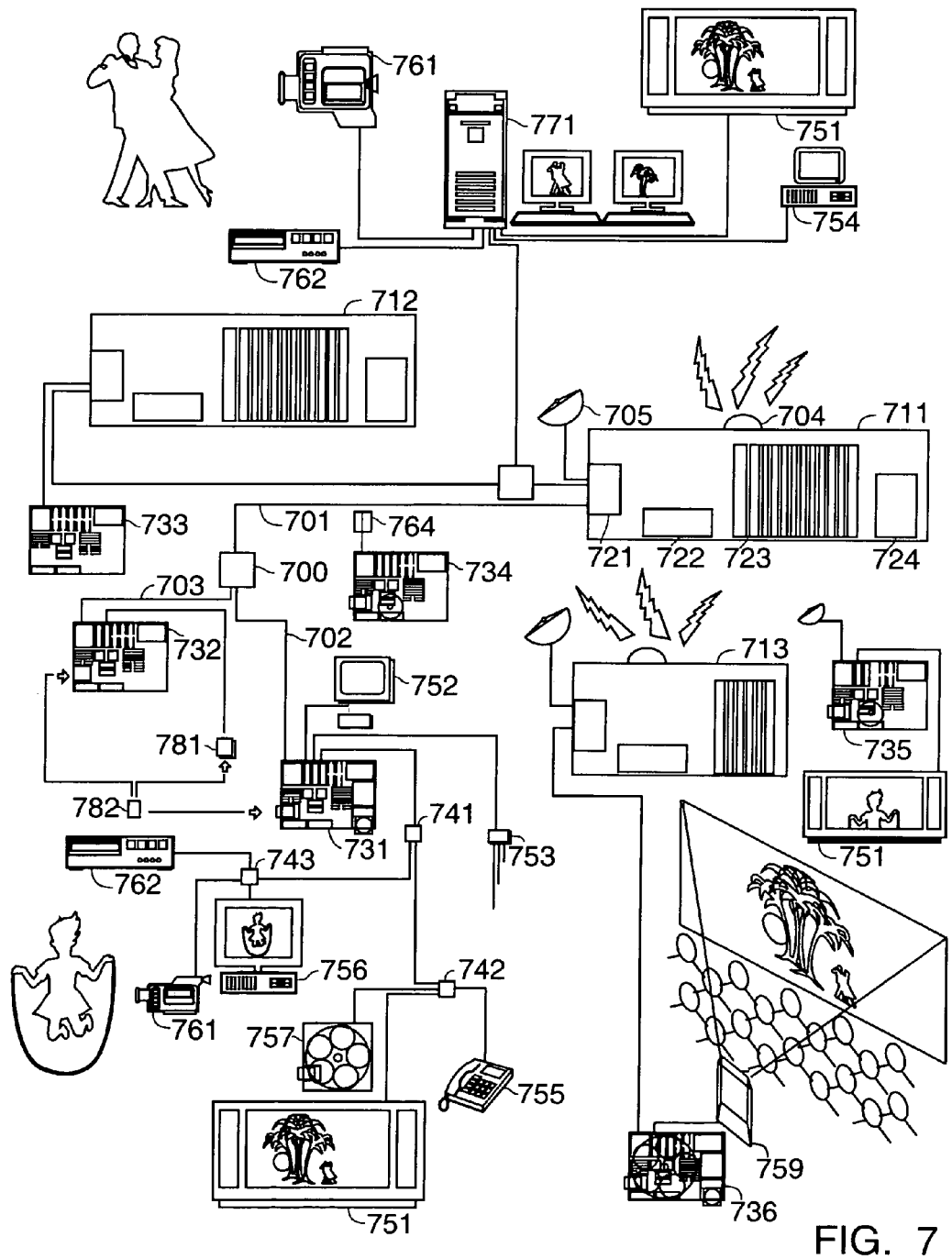
FIG. 7 is a schematic diagram of a video provider and end user network architecture.

FIG. 7 is a schematic diagram of a video provider and end user network architecture in which participants in the network 700 comprise any number of video providers 711-713, and any number of end users 731-736. Participants in the network 700, however, whether classified as video providers 711-713 or end users 731-736 are both providers and end users of video services. Analogous to a communications network, each participant is able to retrieve and transmit video/data from any other participant. An example is the "YouTube" free online video streaming service that allows users to view and share videos that have been uploaded by other users.

A video-on-demand system, in general, a content-on-demand system, the delivery of variable content video services, and the delivery of video maps in particular, are herein intended to be deployable by a variety of possible networks and multimedia player configurations. FIG. 7 suggests a plurality of network infrastructures that may be implemented. Shown are wired and non-wired video transmission infrastructures based on, for example, the use of one or a hybrid combination of the following: fiber optic 701, coaxial cable 702, twisted copper wire 703, microwave, radio WIFI, or Bluetooth 704, and satellite 705.

Each participant in the network obtains a hardware configuration consistent with their desire and objectives, and their financial resources. The video system of a participant who wishes to serve as a video provider 711-713 is functionally equivalent to the multimedia player device previously detailed with respect to FIG. 4, differing only in that the respective resources are appropriately scaled and modified to simultaneously access a variety of videos, and service a number of end users. Both an end user's multimedia player 731 and a nonlinear editing system 771 are in fact video servers. A video server of a video services provider is distinguished principally by the significantly greater video storage capacity and the number of video streams it can service.

A video provider system, for example 711, comprises: i) communications technologies 721 for establishing a plurality of video and communications streams to a plurality of multimedia players 731-736 to enable the uploading and/or downloading of information, data and/or video content, such as segments and videos; ii) processing hardware and software 722 for retrieving from a multimedia player an end user's video preferences, content preferences, search terms and search requests, and for processing the user's video preferences, content preferences, search terms and search requests. e.g., performing searches of segment data to identify the segments or list of segments responsive to a users search terms and search requests; iii) mass storage random access memory devices 723 for storing and retrieving video maps (e.g., segment data), and/or a videobase comprising a plurality of any combination of video segments, motion pictures, conventional programs, interactive games and services, and variable content videos; and iv) processing hardware and software 724 for maintaining accounting and support services in connection with video services provided.

Simply stated, a variable content video provider system 711-713 comprises a video server and the video server software being enhanced to deliver variable content video services.

Video providers may be further categorized according to the functions served and/or the extent and character of the data and videobase maintained. Central video services providers 711 may be capable of providing a greater variety of video services than for example regional or local services providers 713. Regional or local services providers 713, however may be the source of local interest video services such as are currently broadcast by local television stations. Other video services providers 712 may act as "libraries" for specialized categories of videos, as for example an historical video archive of government proceedings; or services as for example electronics shopping. The internet architecture and the different classes of web sites is suggestive of the wide range of multimedia configurations that are possible.

A user's access to the resources of a video services provider 711-713 need not be direct. A requested video may be downloaded, in real time or non-real-time, to a services provider that may be more economically accessible to the intended user. Within the network, some video services provider may not directly provide any services to users, but act as centralized video originators or depositories for other services providers.

The video server's mass storage random access memory devices 723 for storing a plurality of variable content videos may advantageously implement a multiple-read/write head architecture. This would also facilitate the simultaneous retrieval of several versions of a video from a single video source to satisfy simultaneously the particular viewing requirements of several end users. A multiple-read-head architecture reduces, for example, the number of copies of a video that the on-line video server may need to store.

In this context it is also noted that the mass storage devices may additionally implement stripping methods to store a video across several storage devices. Where cost effective, a variable content video may be entirely or partially stored in RAM.

The particular configuration of a end user's multimedia player's random access, storage, memory, processing, and communication means and capabilities are responsive to, but are not necessarily limited by, the minimum requirements of, for example, a particular service provider. A multimedia player configuration, such as detailed with respect to FIG. 4, provides the required video accessing and storage, processing, and communications architecture required by a network-based remote video services provider.

The multimedia player's multi-user and multi-services modules support separate controlled independent access by a plurality of users of the multimedia player's processing, video, and communications resources. In addition to the primary video display system 751 supported by a multimedia player 731, the multi-user module and multi-services module installed also provides services to a monitor/keyboard 752, security system 753, personal multimedia computer 756, voice and/or video/voice telephones 755. In this fashion a multimedia player acts an intermediate services provider.

The particular location of the multimedia player, subsystems, or components, whether within the immediate boundaries of a residence, automobile, or the particular location of the end user, are not limited herein to any particular arrangement. A variety of configurations are possible to meet the various needs at any particular time of the end user. In a preferred embodiment a multimedia player is similar in size and weigh to a super thin portable notebook computer. This permits a user to have available all of the functions herein detailed irrespective of the user's particular location at any moment in time.

In commercial applications, such as a theater, a multimedia player 736 may support a high definition projector 759. For illustration purposes, connections between multimedia players and output devices are shown with lines. However, communications may be established by any of a variety of wired or wireless means. Thus, a multimedia player 731 need not be directly or indirectly connected by wire to the devices 751-759, 561-562. Further, devices 751-759, 761-762 may be connected to a communications port 741-743 which is in communications with the multimedia player 731. The communications port may be of varying degrees of intelligence and capabilities, it may serve to boost or manage the signal, or have no other purpose than to serve as a convenient outlet in which to plug and unplug devices.

In an embodiment as shown if FIG. 7, a location will be "wired" or "networked" to enable a self configuring multimedia player to identify and establish a communications with other devices in the network.

Additionally, multimedia player modules may themselves be physically distributed over the network. The plug and play of modules across a network architecture permits, for example, that the video disc module be physically remote from a multimedia player's 731 main unit and plugged on a port 742 near the television 751. In this instance, the case 757 housing the video disc module also houses a compact storage module. Thus, a single video disc module can be easily moved from one location 742 to another location 743 when physical proximity is required to conveniently replace discs. It is noted that while the disc module case 757 is connected to a first port 742, it would be remotely accessible to a terminal 756 plugged into a second port 743.

FIG. 7 also shows, for example, the use of a separate compact portable storage subsystem 781 and a user access media 782 to physically transport user data, video map, and/or video between multimedia players 731-732.

A multimedia player's core components may be located anywhere inside or outside the location. Specially, where a multimedia player includes fans and disk drives, the top of the TV set would not be an ideal location.

As detailed previously, the user's control of a multimedia player is either through an infrared control keypad, wired or infrared alphanumeric control keyboard, voice control, or system controls directly on the multimedia player. These controls may be directly incorporated in the devices accessing the multimedia player such as a TV.

The novel combination of an external fiber optic based communications module and a multiple read/write storage module, provides a multimedia player configuration capable of efficiently downloading significant amounts of full motion video to be viewed, played with, or processed at the end user's leisure. In such a multimedia player, the downloading of, for example, a feature length motion picture, an interactive video game, or a series of lectures can be achieved with unprecedented speed.

As suggested earlier, an object of FIG. 7 is to convey the concept that an end user's multimedia player 731-736 and an editing system 771 can both upload and download video and video maps through the network directly to other end users 731-736, editing systems 771, and/or to the video servers of videos services providers 711-713.

A multimedia player may be configured to duplicate the functions of a nonlinear editing system as previously detailed. Both the multimedia player 731 and the editing system 771 are capable of receiving input from other sources such as a digital video camera 761 and video recorder 762. As is the case with multimedia player 731, the editing system 771 is capable of outputting video to, for example, a TV 751 and to a PC 754.

As indicated previously, a multimedia player can accommodate a plurality of compression and decompression technologies to both retrieve and decompress videos and compress and transmit videos through the network. Preferably, a specific video originating at a digital camera 761, downloaded to a nonlinear editing system 771, transmitted over the network 700 to a video server for retransmission over the network 700 to a multimedia player 731 will utilize a single compression technology to avoid compounding the effects of artifacts that may be introduced by a particular compression technology. Clearly, where the decompression technology resides completely in software, the video itself could provide the required decompression software.

As indicated above, variable content video services can be delivered by means of any of a number of non-wired based video delivery systems. For example, microwave technologies may provide two way video services including movies-on-demand. The network uses a series of transmitters 704, each of which is capable of broadcasting a digital signal. End users utilize an antenna 764 to receive the signal. The antenna 764 is connected to a decoder connected to a TV set. In an embodiment, a multimedia player 734 performs the processing and decoding functions required for transmission to a video display.

In a preferred embodiment of a cellular-like system, a video provider's cell site 713 comprises microwave communications, video server, and processing systems for establishing a plurality of video and communications streams to a plurality of multimedia players 731-736.

A multimedia player's capability to obtain videos from a remote video provider permits an end user to efficiently obtain, from an extensive videobase, a video(s), segment(s) of a video, and/or segment(s) from each of a plurality of videos, to be viewed at the time of the user's choosing, over which the user exercises complete control as to the subject matter, form of expression, and other elements comprising the video. Further, the resulting video need not comprise or result from a single videobase. A video may result from the automated selection of a variety of segments/videos from one or a plurality of videobases.

Accordingly, for example, a user wishing to retrieve a summary, analysis, and background regarding a particular news event, will enter his/her request, and a keyword analysis of the request will then result in an on-line linkage through the service center to a database containing information on the videobases for the subject matter desired. In this example, a news source remotely located will download a listing of the various sources of summary, analysis, background information, the corresponding video maps where available and necessary, and the overall lengths and costs, if any, of each segment. Based on this listing, the user may at his/her leisure produce a request for a video for his/her own viewing. In this example, a video comprising a 10 minute summary from a news source, a 5 minute analysis from another service, a 10 min. analysis from a private source, a 30 minute lecture from a university, and copies of a relevant data from the Library of Congress are requested.

Once the user finalizes the video segment choices, the request is transmitted to the service center, wherein the various providers (libraries) which may be located anywhere in the world are electronically requested to transmit the respective segments/programs, video maps, and any user routines. These are logically assembled and merged by the service center and retransmitted to the user together with any billing information. The transmission and retransmission of the videos might be on a non-real-time compressed digitized format.

The event duration in this example may be 15 minutes of connect time, 2 minutes of transmission time (for the 55 minute content of video). The costs for the service may be less than a conventional movie, and may include a partial rebate for the user selection to activate the five minutes of targeted "advertisements" that are included.

Since a multimedia player may be both a retriever and a transmitter, the above "video" might be condensed by the user into a 10 minute summary and a 2 minute personal message and transmitted to another user, incurring where applicable connect time and redistribution charges.

In another example, a user may construct a content preference structure of any desired detail, further including, for example, a variety of keywords to describe the video's subject matter, content preferences, the story line, possible endings, and approximate video playing time. The user will transmit this information to a video provider. The user will further indicate the video's delivery by requirement (minutes, overnight, days), and whether the request is for a single video or a series of videos, and their frequency.

The video provider will analyze the user request, and search the videobase for a video matching the user's requirements. If the video is found, then video information, and billing, if any, are transmitted to the user for approval and subsequent video transmission to the user.

The video information transmitted to the user may include, for example, a list of the videos that are responsive to the user's content preferences and subject matter and/or programming preferences, as well as detailed descriptions including the amount, percentages, times, and other quantitative and qualitative information regarding the content of each of a plurality of content categories. The great variety of descriptors herein identified provide for detailed quantification and classification of the content within a video. For example, thematic segment, performer and Action version data enable the calculation of the number of minutes a performer appears in a noteworthy martial arts thematic segment within an Action version of a video.

In a video-on-demand environment, typically users will be expected to request the delivery of specific pre-produced variable content videos. In addition to the other method disclosed herein a video may be obtained by, for example,: i) specifying the video's title or code obtained from a reference guide; ii) making a selection from a listing in alphabetical order by title, subject matter, actors, etc.; iii) tree structure of video classifications, for example advertisements, automobiles, 4WD; iv) keyword searching and retrieval; v) specifying preferences for a content level in each of a plurality of content categories; vi) versions, subject, and/or performer preferences; and vii) any combination of these. It is noted that a reference guide may be available in a real-time format compatible with a multimedia player, e.g. retrieved from a Web site.

In the event that a match between a user's content requirements is not exactly satisfied by the available videos, the search software may, at the user's option or by default, reduce or eliminate content criteria to provide a listing or selection of videos that approximate as close as possible the user's requirements. For example, assuming that a user's request comprises, among other content requirements that a motion picture include graphic sexuality and a high level of suspense and humor, and that no such motion picture is found, then the video provider's videobase search software could lower the level of sexuality to explicit, and search on that basis. The search could alternatively, or in addition, lower the level of suspense to a medium level. On this basis the user is than presented with a listing of the available motion pictures at each of the adjusted combination of requirements.

Once a video is selected, the entire variable content video, including all the non-linear segments and the video map, may be transmitted to the user's multimedia player. When the video map is not downloaded, a video is transmitted that results from the application of the user's video content preferences to the video map of the requested video. That is, a sequence of only those segments that are consistent with a user's content preferences is transmitted. In those instances where the entirety of a variable content video is downloaded, the multimedia player need not store all of the segments, and if all of the segments are stored, they need not all be stored for more than a transitory time, i.e., the time for a user to desire the erasure of undesired content. A video map provides the information to omit the initial storage or to erase, the storage of content of the video. This would be of particular benefit for, for example, a parent downloading an "R" motion picture, and after viewing it, causing the erasure of those segments which are inconsistent with a "PG" version. Or for example, a user causing, for example, only a Romance version, or the results of keyword searches to be saved.

A significant advantage of the partial erasure of content is that storage capacity is freed for a subsequent use. In such instances, the original video maps may be retained; only the relevant data of the video map may be retained separately and/or incorporated within a master video map, data or index of the contents of the storage device.

Alternatively to the downloading a video, the end user remains on-line with the video provider during the transmission of the video and utilizes the hardware resources of the video provider. In an on-line architecture, a multimedia player comprising principally communications capabilities without significant local storage, processing, or memory, is adequate. In such an architecture, a user's content preferences, if not stored in the multimedia player, may be retained by the video provider.

A number of internet based video marketplaces, video sharing, and video delivery systems, methodologies, and embodiments have been implemented, such as: video search, e.g., Google Advanced Video Search http://video.google.com/videoadvancedsearch, and Yahoo! Video: Advanced Search http://video.yahoo.com/video/advanced?ei=UTF-8; video-on-demand, e.g., DVD Empire http://www.dvdempire.com; and a file sharing protocol tracker, e.g., The Pirate Bay (http://thepiratebay.org/), the teachings of such systems and methods are incorporated herein by reference. These systems evidence the feasibility of video-on-demand over the internet in addition to video-on-demand over, for example, a TV cable system.

The synergistic integration of the capabilities of the video and communications network detailed with respect to FIG. 7, and the capabilities of the multimedia multi-source receiver transmitter player detailed with respect to FIG. 6, enable the retrieval, of downloading and sharing of video across a variety of networks implementing a number of methodologies, including an internet based downloading and uploading of video.

A significant contribution intended by the present disclosure is to further advance the benefits of providing to consumers the synergistic inclusion of a video map with the visual and audio components of a video, and to further advance the potential of a variable content video.

The teachings disclosed herein, directly and indirectly by, for example, incorporation, are intended to show a variety of architectures, services, capabilities, systems, methods, and inventive elements which are combined and may be combined to suit particular embodiments. The synergies among and between the various inventive elements is a significant feature of the disclosures herein. The various examples included herein demonstrate that it is intended, and deemed advantageous, that each of the methods detailed herein benefit from the teachings presented with other methods detailed herein and/or incorporated by reference.

Further, it is the intent of incorporation to derive the full benefits, as an addition or an alternative, of the logical integration of the teachings herein with the teachings of the references cited. The incorporation by reference at a specific place within the specification is not intended to limit the extent to which the reference is incorporated, or the manner in which it may be integrated.

Where a teaching may be deemed to be at cross purposes, or otherwise incompatible, with some other teaching, it ought to be understood as a possible alternative to be utilized as a particular preferred embodiment may require. Clearly, it may be neither advantageous nor practical for all the elements or a particular combination of elements to be implemented in a single embodiment.

While elements of the inventions have been detailed in conjunction with specific embodiments thereof, it is evident that many alternatives, modifications and variations are possible and will be apparent to those skilled in the art in light of the foregoing description. Accordingly, it is intended to embrace all such alternatives, modifications, variations, and combinations as fall within the spirit and broad scope of the specification.

While the title, abstract, and claims initially presented are drawn to particular inventive elements, it is intended that other inventive elements disclosed herein will be the subject of their own corresponding claims.

The teachings that have been cited and incorporated herein are offered by way of example, and not limitation, of the underlying foundation of knowledge and skill that is available. Many of the features, components, and methods found in the art may be incorporated, as suggested herein, in a preferred embodiment; and since other modifications and changes varied to fit particular requirements and environments will be apparent to those skilled in the art, the inventions are not limited to the embodiments set forth or suggested herein. It is to be understood that the inventions are not limited thereby. It is also to be understood that the specific details shown are merely illustrative, and that the inventions may be carried out in other ways without departing from the broad spirit and scope of the specification.

What is claimed is:

1. An apparatus capable of processing data, the data comprising: (i) a plurality of segment definitions each defining a video segment within a video; (ii) a name of a character depicted within a defined video segment; (iii) a name of a performer of a depicted character; (iv) a reference to a visual depiction of a depicted character; and (v) a reference to a visual depiction of a performer of a depicted character; the apparatus performs the steps of:

receiving, from a user, during a playing of a video, a request for information for identifying a performer of a character that is depicted during the playing of the video;
identifying a current location in the video;
identifying a segment definition that includes the identified location;
identifying a name of a character depicted within a video segment defined by the identified segment definition;

identifying a name of a performer of the depicted character;

retrieving, responsive to the reference, a visual depiction of the depicted character;

retrieving, responsive to the reference, a visual depiction of the performer of the depicted character; and providing, the user, the identified name of the depicted character, the identified name of the performer of the depicted character, the visual depiction of the depicted character, and the visual depiction of the performer of the depicted character.

2. The apparatus of claim 1, wherein the apparatus further performs the step of retrieving and providing, the user, a filmography corresponding to the performer of the depicted character.

3. The apparatus of claim 1, wherein the apparatus further performs the step of pausing the playing of the video in response to the receiving of the request for information.

4. An apparatus capable of processing data, the data comprising: (i) a plurality of segment definitions each defining a video segment within a video; (ii) a name of a performer of a character depicted within a defined video segment; and (iii) a reference to a visual depiction of a performer of a depicted character; the apparatus performs the steps of:

receiving, from a user, during a playing of a video, a request for information for identifying a performer of a character that is depicted during the playing of the video;

identifying a current location in the video;

identifying a segment definition that includes the identified location;

identifying a name of a performer of a character depicted within a video segment defined by the identified segment definition;

retrieving, responsive to the reference, a visual depiction of the performer of the depicted character; and providing, the user, the identified name of the performer of the depicted character, and the visual depiction of the performer of the depicted character.

5. The apparatus of claim 4, wherein the apparatus further performs the step of pausing the playing of the video in response to the receiving of the request for information.

6. The apparatus of claim 4, wherein the apparatus further performs the step of retrieving and providing, the user, a filmography corresponding to the performer of the depicted character.

7. An apparatus capable of processing data, the data comprising: (i) a plurality of segment definitions each defining a video segment within a video; (ii) a name of a character depicted within a defined video segment; (iii) a name of a performer of a depicted character; and (iv) a reference to a visual depiction of a depicted character; the apparatus performs the steps of:

receiving, from a user, during a playing of a video, a request for information for identifying a character that is depicted during the playing of the video;

identifying a current location in the video;

identifying a segment definition that includes the identified location;

identifying a name of a character depicted within a video segment defined by the identified segment definition;

identifying a name of a performer of the depicted character;

retrieving, responsive to the reference, a visual depiction of the depicted character; and providing, the user, the identified name of the depicted character, the identified name of the performer of the depicted character, and the visual depiction of the depicted character.

8. The apparatus of claim 7, wherein the apparatus further performs the step of pausing the playing of the video in response to the receiving of the request for information.

9. The apparatus of claim 7, wherein the visual depiction is an image depicting only one character and the image is extracted from within the video.

10. An apparatus capable of processing data, the data comprising: (i) a name of a performer of a character depicted within a video frame of a video; and (ii) a reference to a visual depiction of the performer of the depicted character; the apparatus performs the steps of:

receiving, from a user, during a playing of a video, a request for information for identifying a performer of a character that is depicted during the playing of the video;

identifying a current location in the video;

identifying a name of a performer associated with the identified location;

retrieving, responsive to the reference, a visual depiction of the performer; and providing, the user, the identified name of the performer, and the visual depiction of the performer.

11. The apparatus of claim 10, wherein the apparatus further performs the step of retrieving and providing, the user, a filmography corresponding to the identified name of the performer.

12. The apparatus of claim 10, wherein the apparatus further performs the step of pausing the playing of the video in response to the receiving of the request for information.

13. An apparatus capable of processing data, the data comprising: (i) a name of a performer of a character depicted within a video frame of a video; and (ii) a reference to a visual depiction of the performer of the depicted character; the apparatus performs the steps of:

receiving, from a user, during a playing of a video, a request for information for identifying a performer of a character that is depicted during the playing of the video;

continuously identifying a current location in the video;

continuously identifying a name of a performer associated with the continuously identified location;

retrieving, responsive to the reference, a visual depiction of the performer; and contemporaneously updating and providing, the user, the identified name of the performer and the visual depiction of the performer as the video continues to be played.

14. A method of processing data, the data comprising: (i) a plurality of segment definitions each defining a video segment within a video; (ii) a name of a performer of a character depicted within a defined video segment; and (iii) a reference to a visual depiction of a performer of a depicted character; the method comprising the steps of:

receiving, from a user, during a playing of a video, a request for information for identifying a performer of a character that is depicted during the playing of the video;

identifying a current location in the video;

identifying a segment definition that includes the identified location;

identifying a name of a performer of a character depicted within a video segment defined by the identified segment definition;

retrieving, responsive to the reference, a visual depiction of the performer of the depicted character; and providing, the user, the identified name of the performer of the depicted character, and the visual depiction of the performer of the depicted character.

15. The method of claim 14 further comprising the step of pausing the playing of the video in response to the receiving of the request for information.

16. The method of claim 14 further comprising the step of retrieving and providing, the user, a filmography corresponding to the performer of the depicted character.

17. A method of processing data, the data comprising: (i) a name of a performer of a character depicted within a video frame of a video; and (ii) a reference to a visual depiction of the performer of the depicted character; the method comprising the steps of:
- receiving, from a user, during a playing of a video, a request for information for identifying a performer of a character that is depicted during the playing of the video;
- identifying a current location in the video;
- identifying a name of a performer associated with the identified location;
- retrieving, responsive to the reference, a visual depiction of the performer; and
- providing, the user, the identified name of the performer, and the visual depiction of the performer.

18. The method of claim 17 further comprising the step of pausing the playing of the video in response to the receiving of the request for information.

19. The method of claim 17 further comprising the step of retrieving and providing, the user, a filmography corresponding to the identified name of the performer.

20. A method of processing data, the data comprising: (i) a name of a performer of a character depicted within a video frame of a video; and (ii) a reference to a visual depiction of the performer of the depicted character; the method comprising the steps of:
- receiving, from a user, during a playing of a video, a request for information for identifying a performer of a character that is depicted during the playing of the video;
- continuously identifying a current location in the video;
- continuously identifying a name of a performer associated with the continuously identified location;
- retrieving, responsive to the reference, a visual depiction of the performer; and
- contemporaneously updating and providing, the user, the identified name of the performer and the visual depiction of the performer as the video continues to be played.

* * * * *